United States Patent
Shih et al.

(10) Patent No.: US 8,491,818 B2
(45) Date of Patent: Jul. 23, 2013

(54) SYNTHESIS OF WATER SOLUBLE NON-TOXIC NANOCRYSTALLINE QUANTUM DOTS AND USES THEREOF

(75) Inventors: Wei-Heng Shih, Bryn Mawr, PA (US); Wan Y. Shih, Bryn Mawr, PA (US); Hui Li, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 1298 days.

(21) Appl. No.: 11/943,790

(22) Filed: Nov. 21, 2007

(65) Prior Publication Data
US 2009/0065742 A1 Mar. 12, 2009

Related U.S. Application Data

(60) Provisional application No. 60/867,245, filed on Nov. 27, 2006.

(51) Int. Cl.
| | | |
|---|---|---|
| C09K 11/70 | (2006.01) | |
| C09K 11/72 | (2006.01) | |
| C09K 11/77 | (2006.01) | |
| C09K 11/54 | (2006.01) | |
| C09K 11/56 | (2006.01) | |

(52) U.S. Cl.
USPC .......................... 252/301.6 S; 252/301.6 R

(58) Field of Classification Search
USPC .................... 252/301.6 S, 301.6 R
See application file for complete search history.

(56) References Cited

U.S. PATENT DOCUMENTS

| | | | | |
|---|---|---|---|---|
| 7,226,953 | B1 * | 6/2007 | Petruska et al. | 516/98 |
| 7,335,345 | B2 * | 2/2008 | Shih et al. | 423/561.1 |
| 7,824,653 | B2 * | 11/2010 | Shih et al. | 423/561.1 |
| 7,976,819 | B2 * | 7/2011 | Shih et al. | 423/561.1 |
| 8,080,229 | B2 * | 12/2011 | Shih et al. | 423/561.1 |

OTHER PUBLICATIONS

Li. Photophysical properties of ZnS quantum dots. Journal of Physics and Chemistry of Solids 60 (1999) 13-15.*
Sawada. Kinetic Analysis on the Photoluminescence Enhancement of 3-Mercaptopropyl Trimethoxysilane-Modified ZnS:Mn. Japanese Journal of Applied Physics vol. 44, No. 11, 2005, pp. 8032-8034.*
Barman. Luminescence Properties of ZnS quantum dots embedded in polymer matrix. vol. 8 No. 3 Mar. 2011 p. 171-176.*
Khosravi. Manganese doped zinc sulphide nanoparticles by aqueous method. Appl. Phys. Lett. 67 (17), Oct. 23, 1995.*
Kularni. Investigations on chemically capped CdS, ZnS and ZnCdS nanoparticles. Applied Surface Science 169±170 (2001) 438±446.*
Gerion, Daniele et al., "Synthesis and Properties of Biocompatible Water-Soluble Silica-Coated CdSe/ZnS Semiconductor Quantum Dots" J. Phys. Chem.,B 2001, 105, pp. 8861-8871.
Green, Mark et al., "The Synthesis of Luminescent Adenosine Triphosphate Passivated Cadmium Sulfide Nanoparticles" J. Mater. Chem., 2003, 13, pp. 1859-1861.
Roagach, A.L. et al., "Synthesis and Characterization of Thiol-Stabilized CdTe Nanocrystals", Ber. Bunsenges. Phys. Chem. 100, 1996, pp. 1772-1778.
Enustun, B.V. et al., "Coagulation of Colloidal Gold", Journal of the American Chemical Society, Nov. 1963, vol. 85, No. 21, pp. 3317-3328.
Brus, L.E., "Electron-electron and Electron-hole Interactions in Small Semiconductor Crystallites: The Size Dependence of the Lowest Excited Electronic State", J. Chem. Phys, 80 (9), May 1984, pp. 4403-4409.
Chow, M.K. et al., "Gold Sol Formation Mechanisms: Role of Colloidal Stability", Journal of Colloid and Interface Science, 165, 1994, pp. 97-109.
El-Khair, Hatim Mohamed et al., "Enhancement of Band Edge Emission from ZnS/Zn(OH)2 Quantum Dots", vol. 18, No. 4, 2001, pp. 616-618.
Dabbousi, B.O. et al., "(CdSe)ZnS Core-Shell Quantum Dots: Synthesus and Characterization of a Size Series of Highly Luminescent Nanoctystallites", J. Phys. Chem. B 1997, 101, pp. 9463-9475.
Peng, Xiaogang et al., "Epitaxial Growth of Highly Luminescent CdSe/CdS Core/Shell Nanocrystals with Photostability and Electronic Accessibility" J. Am. Chem. Soc, 1997, 119, pp. 7019-7029.

* cited by examiner

Primary Examiner — Carol M Koslow
Assistant Examiner — Matthew E Hoban
(74) Attorney, Agent, or Firm — Mendelsohn, Drucker & Associates, P.C.

(57) ABSTRACT

An economic, direct synthetic method for producing water soluble ZnS QDs that are ready for bioconjugation is provided. The method can produce aqueous ZnS QDs with emission wavelengths varying from 400 nm to 700 nm. Highly luminescent metal sulfide (MS) QDs are produced via an aqueous synthesis route. MS QDs are capped with thiol-containing charged molecules in a single step. The resultant MS QDs exhibit the distinctive excitonic photoluminescence desired of QDs and can be fabricated to avoid undesirable broadband emissions at higher wavelengths. The aqueous ZnS QDs are stable in biological fluids over a long period of time. In addition, non-toxic ZnS QDs have been produced with good photoluminescence properties.

14 Claims, 18 Drawing Sheets

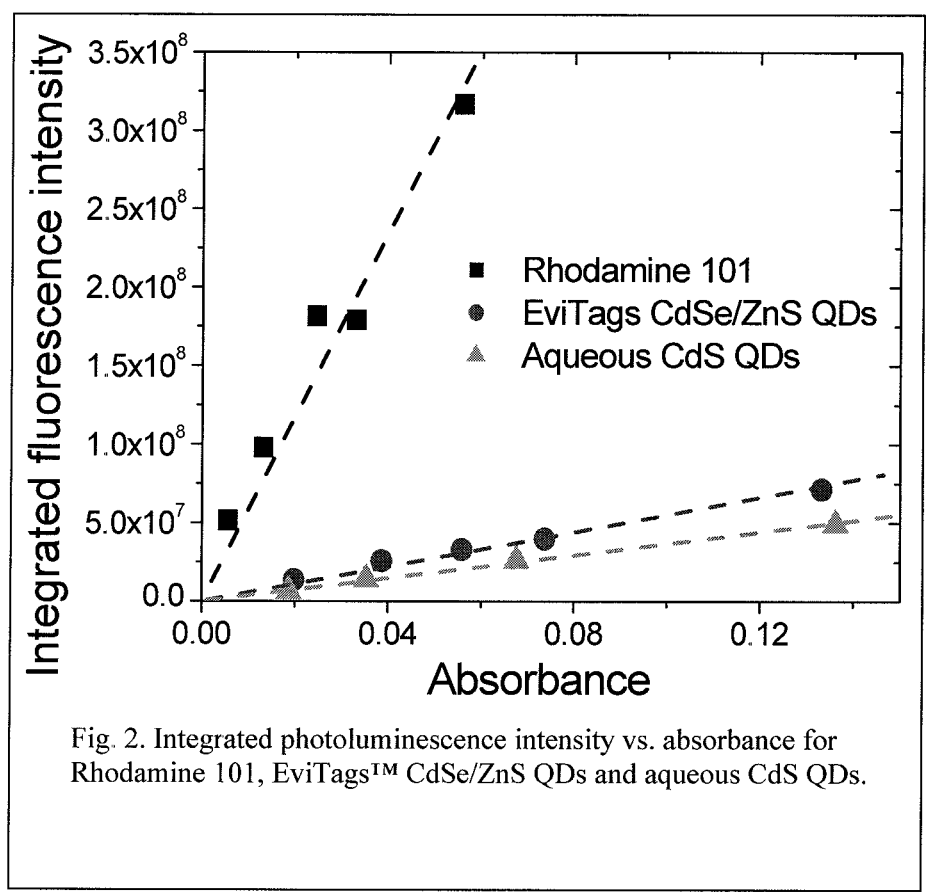
Fig. 2. Integrated photoluminescence intensity vs. absorbance for Rhodamine 101, EviTags™ CdSe/ZnS QDs and aqueous CdS QDs.

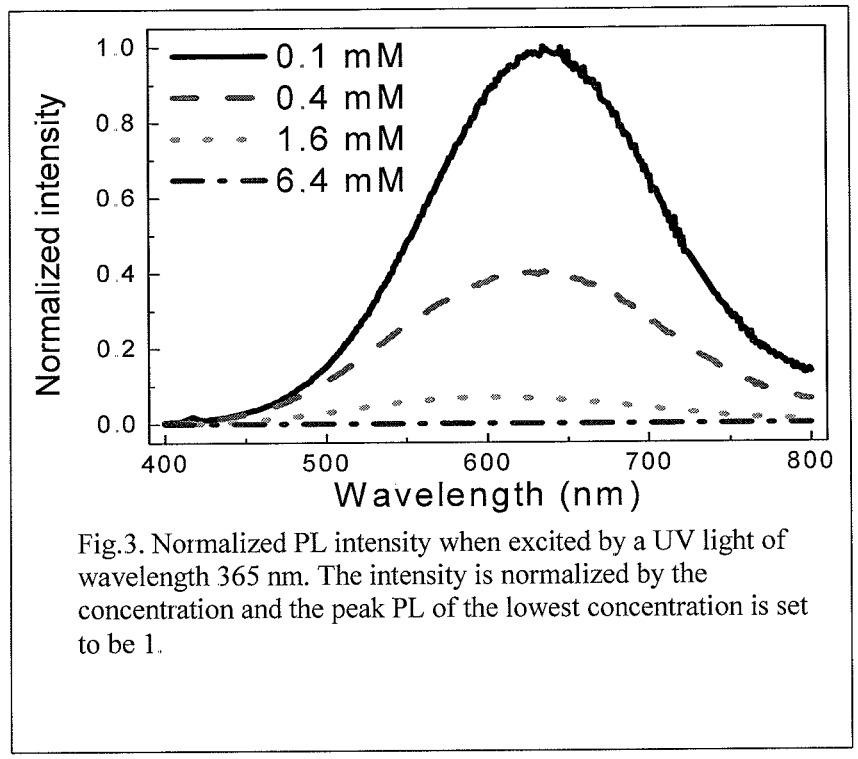
Fig.3. Normalized PL intensity when excited by a UV light of wavelength 365 nm. The intensity is normalized by the concentration and the peak PL of the lowest concentration is set to be 1.
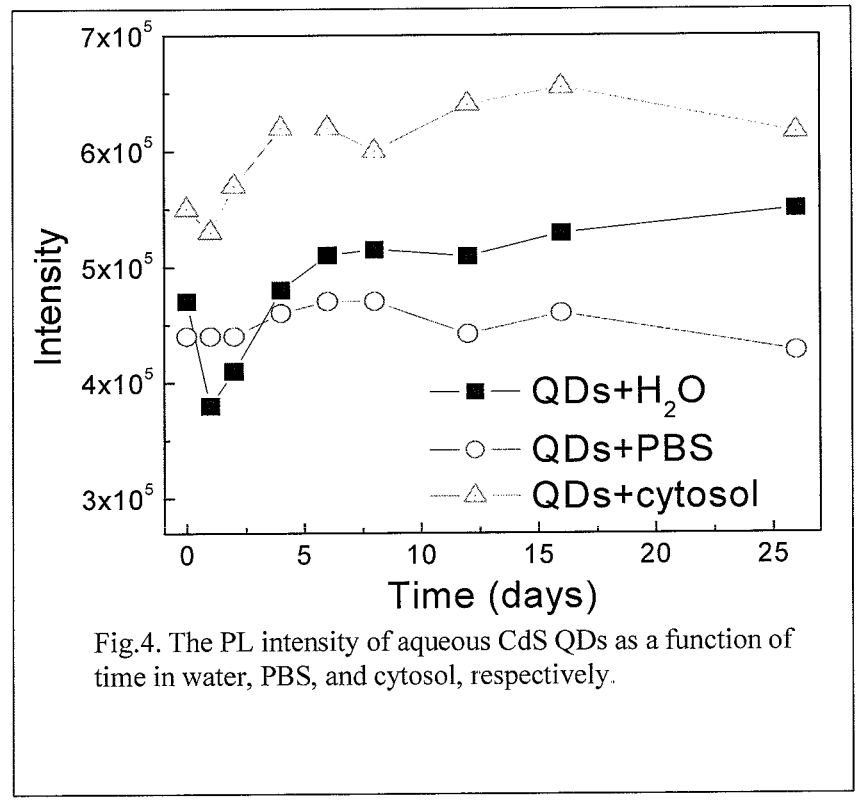
Fig.4. The PL intensity of aqueous CdS QDs as a function of time in water, PBS, and cytosol, respectively.

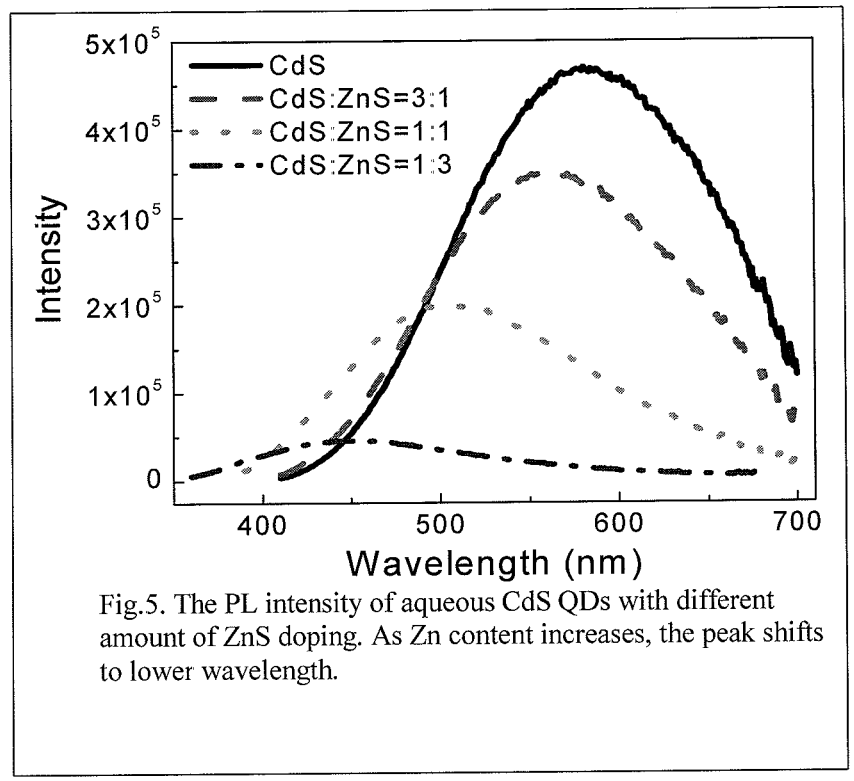
Fig.5. The PL intensity of aqueous CdS QDs with different amount of ZnS doping. As Zn content increases, the peak shifts to lower wavelength.
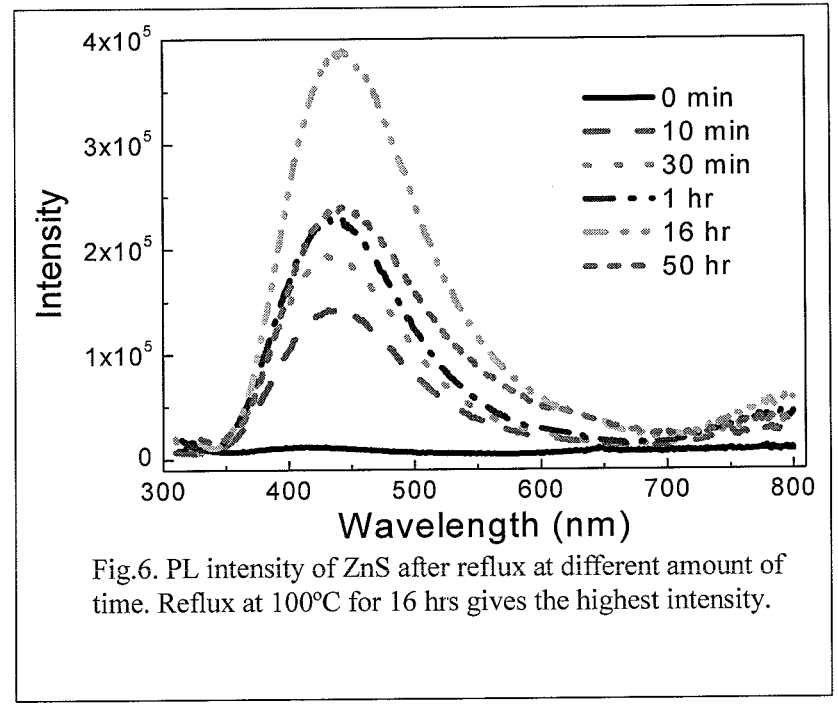
Fig.6. PL intensity of ZnS after reflux at different amount of time. Reflux at 100°C for 16 hrs gives the highest intensity.

SYNTHESIS OF WATER SOLUBLE NON-TOXIC NANOCRYSTALLINE QUANTUM DOTS AND USES THEREOF

STATEMENT OF GOVERNMENT INTEREST

This invention was reduced to practice with Government support under Grant No. R01 EB000720 awarded by the National Institutes of Health; the Government is therefore entitled to certain rights to this invention."

BACKGROUND OF THE INVENTION

1. Field of the Invention Field of Invention

The present invention relates to the aqueous synthesis of photoluminescent nanocrystalline quantum dots.

2. Brief Description of the Prior Art

Semiconductor nanocrystalline quantum dots (QDs) with bioconjugates on the surface have been studied extensively because of their unique optical properties. QDs are inorganic nanoparticles that emit light at a specific wavelength when excited by light. When light shines on QDs, electrons in the valence band are excited to the conduction band, forming short-lived (nanoseconds) electron-hole pairs called excitons, which emit photons of a specific wavelength when the electron-hole pairs eventually recombine. The excitonic emission is independent of the wavelength of the excitation light. This makes it easier to excite QDs to luminescence than the traditional fluorescent molecules that require a specific excitation wavelength. The wavelength of the emitted photons of QDs, on the other hand, is specific and can be controlled by the QDs' particle size and composition. The synthesis of QDs was developed mostly in the 1990's. In the last few years, the interest in using QDs in biomedical imaging has exploded due to advances in surface modification of QDs that have made them accessible for antibody immobilization and detection of antibody-antigen binding.

Using QDs as imaging markers inside living organisms is one of the exciting new nanobiotechnologies. QDs can be used as biological markers to find a disease as well as to carry a drug to the exact cell that needs it by immobilizing antibodies on the surface of the QDs. QDs may be specific to a particular disease and may be tailored to bindonly to infected cells. Detection may be carried out either by locating the QDs' particles or by detecting signals emanating from the QDs' particles. For example, luminescence of antibody-coated QDs bound to the cancerous tissue in a mouse helped locate the tumor.[1] Until now the main biological tags that have been employed are organic fluorophores or radioactive labels.[2] Radioactive labels are short lived and radioactive. Concerns about the use of radioactive materials in the body always arise. Organic fluorophores have wide emission spectra and the emission is not as bright as that of QDs. In comparison to conventional dye molecules, QDs have the advantages of having tunable fluorescence signatures, narrow emission spectra, brighter emissions, and good photostability.[3] Due to the enormous interest in using QDs as biological tags, QDs are now commercially available from quite a number of companies. However, the complexity of the existing organic-based synthesis route for fabricating commercial QDs makes the price prohibitively high, as much as U.S. $1200/g without bio-conjugation[4], and $3200/mg for bioconjugated QDs.[5] Part of the complexity of the existing QDs production technology stems from the need to improve the photoluminescence yield by eliminating the broadband emission of earlier QDs by capping with an inorganic layer. Making QDs water-soluble is another challenge for biomedical applications.

Both groups II-VI nanocrystals such as CdSe, CdTe, CdS,[6,7] ZnS,[8] and ZnSe, and groups III-V nanocrystals such as InP and InAs have been synthesized and studied extensively in the past.[9] One type of quantum dot currently on the market is based on CdSe nanocrystals capped by, for example, ZnS. The synthesis follows the method popularized by Bawendi's group at MIT involving the pyrolysis of organometallic precursors, dimethylcadmium and trioctylphosphine oxide (TOPO) to form CdSe nanocrystals. ZnS capping on CdSe was done using diethylzinc and hexamethyldisilathiane precursors.[10]

Alivisatos and coworkers further made QDs water-soluble by addition of a silica/siloxane coating.[11] With a silica coating, 3-(mercaptopropyl) trimethoxysilane (MPS) is then adsorbed on the nanocrystals and displaces the TOPO molecules, making the surface of the QDs suitable for antibody immobilization.[12] These processes are complex involving multiple steps and a change of solvent from organic to aqueous during the process.

An aqueous process for the manufacture of CdS QDs was published recently using adenosine triphosphate (ATP) as the capping molecule.[13] This process suffers from the disadvantage that the luminescence spectrum of the resultant CdS QDs includes an undesirable non-excitonic broadband emission between 500 nm to 700 nm wavelength.

Rogach et al.[14] describes the synthesis of oxidation-stable CdTe nanoclusters in aqueous solution using 2-mercaptoethanol and 1-thioglycerol as stabilizers. CdTe nanocrystals generally have no luminescent properties until they are stabilized with 2-mercaptoethanol. However, this capping method also yields QDs with an undesirable broadband emission at higher wavelengths. Similarly, when CdTe was stabilized with thioglycerol, a broadband emission at higher wavelengths was also observed. Currently, only the capping of inorganic materials, for example, a ZnSe shell on CdTe core, can eliminate the undesirable broadband emission. Thus, there remains a need for an economic, direct aqueous synthesis route for the production of highly luminescent water-soluble nanocrystalline QDs.

SUMMARY OF THE INVENTION

In one aspect, the present invention relates to a process for the production of ZnS QDs in aqueous media, which are non-toxic, highly photoluminescent, stable and ready for bioconjugation. In the process, water-soluble precursors are employed to manufacture QDs in an economic and environmentally-friendly process in aqueous media. The process involves the reaction of a water-soluble salt of zinc with a thiol-functionalized molecule and a water-soluble sulfide. The resultant products are ready for bioconjugation and have emission wavelengths of from about 400-700 nm.

In a second aspect, the present invention relates to ZnS quantum dots having emission wavelengths of from about 400-700 nm.

BRIEF DESCRIPTION OF THE DRAWINGS

FIG. 2 shows integrated photoluminescence intensity vs. absorbance for Rhodamine 101, EviTags™ CdSe/ZnS QDs and aqueous CdS QDs.

FIG. 3 shows normalized PL intensity when excited by UV light of a wavelength of 365 nm. The intensity is normalized by the concentration and the peak PL of the lowest concentration is set to be 1.

FIG. 4 shows the PL intensity of aqueous CdS QDs as a function of time in water, PBS, and cytosol, respectively.

FIG. 5 shows the PL intensity of aqueous CdS QDs with different amount of ZnS doping. As Zn content increases, the peak shifts to a lower wavelength.

FIG. 6 shows the PL intensity of ZnS after reflux for different time periods. Reflux at 100° C. for 16 hrs gave the highest intensity in this example.

DETAILED DESCRIPTION OF THE PREFERRED EMBODIMENTS

Figure 1:
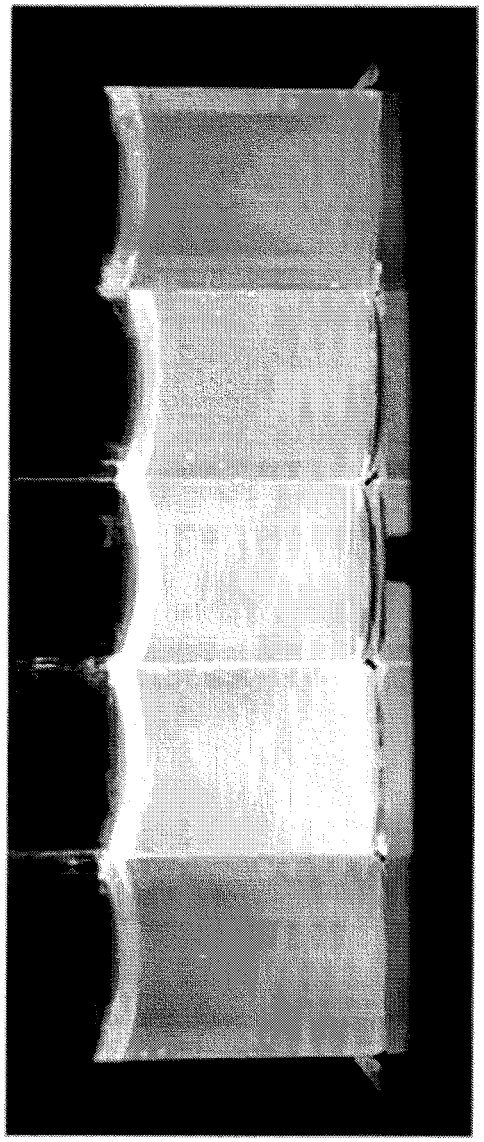
FIG. 1 shows emissions of CdS and ZnS-doped CdS QDs excited with a UV lamp. From left to right (red to blue), the emission maxima are located at 660, 620, 550, 515 and 475 nm.

In a first aspect, the present invention relates to an economic, direct synthetic method for producing water soluble quantum dots (QDs) that are ready for bioconjugation. Highly luminescent metal sulfide (MS) QDs are produced via an aqueous synthesis route. The resultant MS QDs may then be capped with carboxylated molecules in a single step. The capped MS QDs generally exhibit the distinctive excitonic photoluminescence desired of QDs without the undesirable broadband emission at higher wavelengths often present in other QDs fabricated in aqueous media, indicating that the aqueous process of the present invention is effective in producing the substantially clean MS surface that appears to be necessary for a high luminescence yield. This is significant because, as far as the inventors are aware, no known aqueous method has completely eliminated the tendency for the QDs to exhibit an undesirable broadband emission at higher wavelengths.

Furthermore, the carboxylated molecules used to cap the particle surface of the MS QDs render the MS QDs ready for surface immobilization of antibodies and other biomolecules. That the surface of the MS QDs is immediately ready for further biological modification in a single step also represents a significant advantage over the manufacture of QDs by other methods. This results in substantially reduced material costs. In addition to the economic benefits and the potential impact on fundamental research in the field of surface chemistry, the aqueous processing route of the present invention is environmentally friendly and readily adapted to commercial production levels.

In general, the manufacturing process of the present invention may be applied to fabricate QDs from water-soluble precursors. Thus, any QDs that can be made from water-soluble precursors are within the scope of the present invention. The method can be used to produce aqueous QDs with emission wavelengths varying from 400 nm to 700 nm, more preferably, from about 410-500 nm, and, for ZnS QDs, emission wavelengths are preferably from about 410-440 nm.

In the manufacturing process of the present invention, any salt of a metal suitable for use in a quantum dot, that is soluble in water, may be employed as a starting material. Exemplary water-soluble metal salts that may be employed in the invention are metals that can form sulfides, such as $Cd(NO_3)_2$, $Cd(ClO_4)_2$, $CdCl_2$, $CdSO_4$, cadmium acetate, $Zn(NO_3)_2$, $Zn(ClO_4)_2$, $ZnSO_4$, $ZnCl_2$, zinc acetate, $Mn(NO_3)_2$, $Mn(ClO_4)_2$, $MnSO_4$, $MnCl_2$, manganese acetate, $Pb(NO_3)_2$, $Pb(ClO_4)_2$, $PbSO_4$, $PbCl_2$, and lead acetate.

Any suitable water-soluble sulfide may be used as a reactant in the process of the invention. Exemplary water-soluble sulfides that may be employed in the invention are sulfides such as $Na_2S$, $K_2S$. Also, sulfide gases, such as $H_2S$, may be bubbled through the aqueous solution in the process of the invention. The addition of sulfide is preferably done very quickly, and may take only several seconds. Generally, it is desirable to use about a stoichiometric amount of the sulfide. However, varying the amount of sulfide from a stoichiometric amount can, in some cases, produce desirable variations in the particle sizes of the particles and thus, it may be useful to use anywhere from 0.1 to 10 times the stoichiometric amount of sulfide, more preferably 0.5 to 5 times the stoichiometric amount of the sulfide, and most preferably about 0.8-1.2 times the stoichiometric amount of the sulfide. The stoichiometric amount is based on the reaction of the sulfide with the metal to form the metal sulfide.

Also, any thiol-functionalized molecule with a charged group, preferably on the opposite end, may be used as a reactant in the process of the invention, as long as the thiol-functionalized molecule is water-soluble. Exemplary thiol-functionalized molecules for use in the present invention include 4-aminothiophenol, mercaptosilanes such as 3-mercaptopropyltrimethoxysilane, and similar materials, as well as mercaptocarboxylic acids such as mercaptoacetic acid, mercaptopropionic acid, mercaptosuccinic acid, mercaptobenzoic acid, and mercaptoundecanoic acid. Any concentration of thiol-functionalized molecule may be employed, as long as it is within the solubility limit of the thiol-functionalized molecule in aqueous media.

The ratio of the various reactants is not critical and, in fact, may be varied in order to customize the particle size of the resultant capped QDs and to enhance the emission intensity. Generally, however, the molar ratio of thiol groups to metal may vary from about 1 to about 100, though ratios of 1-8 are more preferred, with a ratio of 1.5-3 being preferred, and a ratio of about 2 being most preferred.

In one embodiment of the invention, highly luminescent CdS QDs and ZnS-doped CdS QDs, capped with mercaptocarboxylic acids (MCA) in a single step, are synthesized. Fluorescence results indicate that the QDs exhibit bright fluorescence in the visible range from blue to red as exemplified in FIG. 1. These emissions exhibit different fluorescent colors when excited by a 365 nm UV lamp. Any water-soluble cadmium salt may be used, including but not limited to, cadmium nitrate, cadmium acetate, cadmium chloride, and cadmium sulfate. The molar ratios between the MCA and Cd may vary from about 1 to about 100. More preferably, the molar ratio between the MCA and the Cd is from about 1.5 to about 3, and most preferably about 2.

One advantage of certain embodiments of the present invention is the elimination of the broadband emission of the resultant QDs. A second advantage of certain embodiments of the invention is that a one-step, aqueous process produces QDs capped with $COO^-$, which can readily be activated to form a peptide bond with an amine group of a protein, i.e., is ready for antibody/receptor immobilization on the QD surface. A typical reaction time for the step of chelating Cd with MCA is about 2 hours, though the reaction time may vary depending on the specific reactants and reaction conditions employed. It will be understood by those of ordinary skill in the art that reaction times and conversion rates are not critical to the process of the present invention.

In a more preferred aspect, CdS QDs are synthesized using 3-mercaptopropionic acid ($HSCH_2CH_2COOH$) (MPA), cadmium nitrate ($Cd(NO_3)_2$) and sodium sulfide ($Na_2S$). For biological applications, such as biomarkers, where antibodies need to be conjugated to the QDs, aqueous suspensions of QDs are most desirable since the conjugation process can be accomplished directly in the aqueous suspension without further preparative steps.

In another aspect, a capping molecule capable of chelating with Cd ions to minimize the formation of impurity states due to dangling Cd ions is required. These capping molecules should also act to stabilize and limit the growth of the particles. 3-mercaptopropionic acid ($HSCH_2CH_2COOH$) (MPA) is preferred as the capping molecule because it has a thiol group that can bind to Cd. This follows the example of synthesizing monodispersed gold suspensions using sodium citrate.[15] Citrate not only reduces the gold but also serves as the capping molecule to stabilize the gold particles. By varying the ratio of citrate to gold, gold particle size is controlled.[16] Without being bound by theory, MPA may play a similar role to cap and stabilize CdS particles in the QD suspension.

Occasionally, difficulties may arise during the reaction if the pH of the reaction mixture is in the vicinity of the isoelectric point (IEP) of the metal sulfide particles. Thus, in such cases, it may be desirable to adjust the pH of the reaction mixture away from the IEP using a suitable, water-soluble pH-adjusting agent, before the addition of sodium sulfide. Exemplary suitable pH-adjusting agents are ammonium hydroxide and tetrapropylammonium hydroxide. The concentration of the pH-adjusting agent may be varied, as necessary, to produce optimum results. Preferred concentrations of ammonium hydroxide are in the range of about 0.5-2M and, more preferably, about 0.8-1.2 M, with about 1M being the most preferred concentration of the ammonium hydroxide pH-adjusting agent. Preferably, the pH is adjusted to enhance crystallization of the QDs. For example, for ZnS QDs, a pH of at least about 8 during synthesis provides favorable luminescence properties, more preferably a pH of at least 10, with a pH of about 11-13 being even more preferred for synthesis of ZnS QDs.

After adjustment of the pH away from the IEP of the metal sulfide, sodium sulfide is added quickly to start the crystallization of all particles substantially simultaneously. A few minutes of reaction time are sufficient. The process is best performed in oxygen-free environment to avoid the photo-oxidation reaction of sulfur. To prevent particle growth, the reacted solution is quenched to freezing point of water and then stored in refrigerator.

Figure 11:
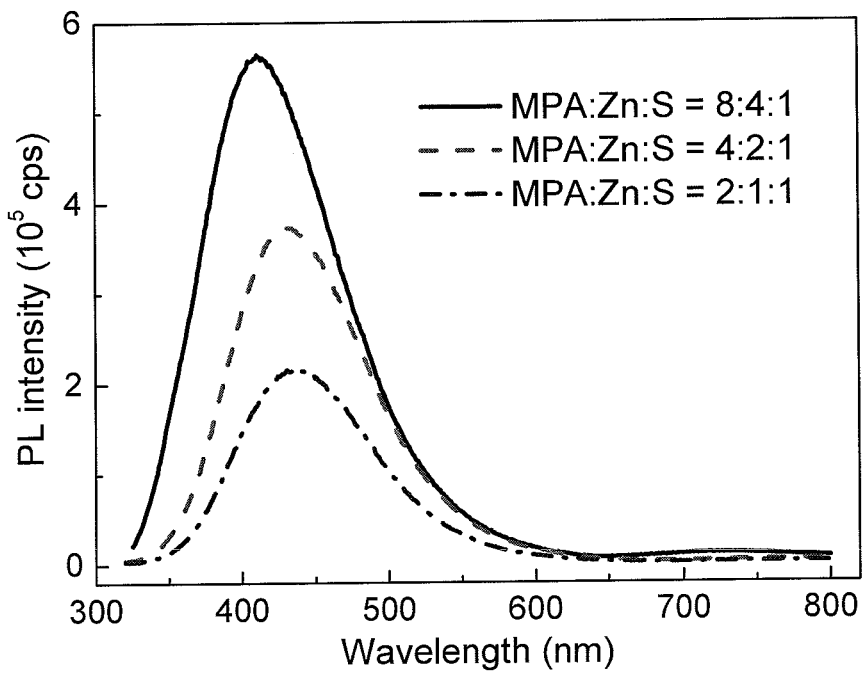
FIG. 11 shows the PL spectra of three ZnS QDs samples synthesized at pH 12, with different MPA:Zn:S ratios of 8:4:1, 4:2:1 and 2:1:1.

Varying the ratio of MPA:Zn:S, as shown in FIG. 11, may influence PL. In general, use of excess Zn provides higher emission intensity. The ratio of MPA:Zn:S=8:4:1 was found to be an optimal composition showing a strong emission and high quantum yield. In addition, the sample with more MPA exhibits a smaller emission peak wavelength. Thus, molar ratios of Zn to sulfide of from 1-8 may be employed, with ratios of 2-6 being more preferred and ratios of 3-5 being most preferred. Higher molar ratios of Zn to sulfide tend to provide quantum dots with smaller particle sizes which may be as low as about 4.7 nm. Preferably, the particle size of the ZnS quantum dots is from about 2-10 nm, more preferably from about 4-6 nm, and most preferably, from about 4.5 to about 5.5 nm.

With the quantum yield of Rhodamine 101 taken as 100%, the quantum yield of the ZnS QDs is preferably at least 15%, more preferably at least 25%, and most preferably, at least 30%, with quantum yields potentially ranging up to a maximum of about 50%.

In another embodiment, the desired QDs may be prepared using the MPS replacement method which includes the following two steps: (1) precipitation of the QDs with MPA, and (2) replacement of some or all of the MPA with MPS. First, MPA-capped QDs are produced directly in water. The obtained MPA-capped ZnS QDs suspension was quenched and stored in a refrigerator. Preferably, the sample is allowed to reach equilibrium before carrying out the second step of the MPS replacement method. In the second step, MPS solution with basic was added and mixed thoroughly with the MPA-capped QDs whereby at least some of the MPA capping molecules are replaced by MPS capping molecules. Different amounts of MPS may be used to prepare samples with different MPS:Zn:S ratios, with the amount of MPS preferably being sufficient to provide ratios of MPS:Zn:S of from about 0.125:4:1 to about 12:4:1, more preferably, from about 0.5: 4:1 to about 10:4:1 and, most preferably, from about 1:4:1 to about 8:4:1. It was found that QDs prepared by this MPS replacement method exhibited some advantageous properties, as discussed below in the Examples.

EXAMPLE I

Aqueous Synthesis of CdS QDs $1.6 \times 10^{-4}$ mol $Cd(NO_3)_2$, $1.6 \times 10^{-4}$ mol $Na_2S$, and $3.2 \times 10^{-4}$ mol MPA, respectively, were prepared and each was dissolved into about 33 ml deionized water with stirring. The $Cd(NO_3)_2$ solution was added to the MPA solution at 2 ml/min with continuous stirring. $NH_4OH$ (1 M) was added to the mixed solution to adjust the pH value to a pH of about 7-9. The $Na_2S$ solution was then quickly poured into the mixed solution and stirred for about 3-5 min. All of the above process steps were performed in an oxygen-free environment. In the present example, these steps were performed in a sealed glove bag pumped with nitrogen flow. An ultrasonicator was used to apply sonication for about 5-10 min. Large agglomerates were removed by filtration, as necessary. CdS nanoparticles were obtained in a clear suspension. The suspension was quenched in a freezer to 0° C., and the suspension was stored in a refrigerator at about 4° C.

EXAMPLE II

Aqueous Synthesis of CdS QDs with ZnS Doping $0.8 \times 10^{-4}$ mol $Cd(NO_3)_2$ and $0.8 \times 10^{-4}$ mol $Zn(NO_3)_2$, respectively, were prepared and each dissolved into 16 ml deionized water with stirring. $1.6 \times 10^{-4}$ mol $Na_2S$ and $3.2 \times 10^{-4}$ mol MPA, respectively, were weighed and each dissolved into 33 ml deionized water with stirring. The $Cd(NO_3)_2$ solution was added into the MPA solution and then the $Zn(NO_3)_2$ solution was added into MPA solution at about 2 ml/min with continuous stirring. Thereafter, the process described in Example I was followed. The CdS with ZnS doping (1:1) QDs are obtained as a clear suspension. Other doping ratios can be employed by adjusting the Cd to Zn molar ratio.

Quantum Yield

To obtain the quantum yield of the aqueous CdS QDs, Rhodamine 101 was used as the standard sample, and the commercial QDs were compared. All the measurements were performed at the same conditions for Rhodamine 101, for the commercial EviTags™ CdSe/ZnS QDs and for the aqueous CdS QDs of the present invention. For each sample, the absorbance and integrated photoluminescence (PL) intensity were collected at a fixed excitation wavelength 365 nm for several different concentrations. The absorbance was always kept below 0.15 to eliminate the re-absorption interaction effect. Using Rhodamine 101 dissolved in ethanol as the standard sample with known quantum yield of 100%, the quantum yield of EviTags™ CdSe/ZnS QDs was found to be 8.9%, and the quantum yield of the aqueous CdS QDs was 6.0%. Without the core-shell structure, the aqueous CdS QDs have achieved high quantum yield comparable to that of the commercially available EviTags™. FIG. 2 shows integrated photoluminescence intensity vs. absorbance for Rhodamine 101, EviTags™ CdSe/ZnS QDs and aqueous CdS QDs.

Concentration Effect

It was found that the PL properties of the aqueous QDs depend on the precursor concentration. For the samples synthesized at different Cd precursor concentrations of from 0.1 mM to 6.4 mM, the emission spectra varied. There was no linear relationship between the PL intensity of CdS QDs and the precursor concentration. FIG. 3 shows the normalized PL intensity of aqueous QDs for several precursor concentrations. After normalization based on the concentration, the QDs with the lowest precursor concentration displayed the highest PL intensity. It is speculated that at high precursor concentration, not all precursor was nucleated and grown into particles. Perhaps the excess precursors remained in the solution and didn't contribute to the PL intensity.

Stability

The CdS QDs suspension obtained using a precursor concentration of 1.6 mM was mixed at a volume ratio of 1:3 with de-ionized water, phosphate buffer solution (PBS (1×)) and cytosol ($10^6$ cells/ml), respectively. FIG. 4 shows the PL intensity of aqueous QDs in the three solutions for up to 26 days, during which the samples were stored in the refrigerator at 4° C. away from normal daylight. The samples were taken out of the refrigerator for PL measurements on the designated days. It was shown that the aqueous CdS QDs have good stability with de-ionized water, PBS and cytosol. The results indicate that the aqueous QDs can be used as excellent fluorescence markers in biological solutions for biomedical imaging over a long period of time due to their stability.

Effects of ZnS Doping

ZnS was added to the CdS QDs to create different wavelengths of photoluminescence. FIG. 5 shows the PL intensity of ZnS-doped CdS QDs at several different ZnS contents. As the concentration of ZnS increases, the PL peak shifts toward smaller wavelengths. However, the PL intensity also decreases with increasing amount of ZnS.

EXAMPLE III

Synthesis and Characterization ZnS QDs with MPA

Aqueous ZnS QDs were synthesized at room temperature as follows. First, appropriate amounts of zinc nitrate ($Zn(NO_3)_2$), sodium sulfide ($Na_2S$), and 3-mercaptopropionic acid (MPA) (Alfa Aesar, Ward Hill, Mass.) were dissolved in deionized (DI) water separately. For a MPA:Zn:S composition of 1:1:1, 0.08 mmol $Zn(NO_3)_2$ was first dropped slowly into the solution containing 0.08 mmol MPA with continuous stirring. Then the pH of the mixture was adjusted by adding the tetrapropylammonium hydroxide $((CH_3CH_2CH_2)_4NOH)$ (Alfa Aesar, Ward Hill, Mass.). After the desired pH was obtained, 0.08 mmol $Na_2S$ was added quickly with vigorous stirring to precipitate ZnS nanoparticles. 5 minutes was allowed for the precipitation to complete. If a higher Zn content was desired, the excess Zn was added after the initial precipitation, and the suspension was allowed to cure at room temperature for 5 more minutes. The final QDs suspension had a volume of 50 ml and a nominal ZnS concentration of 1.6 mM based on the concentration of S, as the concentration of Zn varied depending on whether the sample had Zn excess. The obtained QDs suspension was then stored in a refrigerator at 4° C. and could remain clear for months. Unless mentioned otherwise, all ZnS QD suspensions described below had a 1.6 mM nominal concentration.

Photoluminescence (PL) spectra of the ZnS QDs suspension were measured using a QM-4/2005 spectrofluorimeter (Photon Technology International, Birmingham, N.J.) with both the excitation and the emission slit width set at 2 nm. From the excitation spectra, the wavelength for the optimal emission intensity was identified, and the PL emission spectra were then obtained with using the optimal excitation wavelength. UV-V is absorption spectra were collected using a Lambda-40 UV-Vis spectrometer (PerkinElmer Life And Analytical Sciences Inc., Boston, Mass.) with a slit width of 2 nm. All spectra including the PL spectra and the absorption spectra were obtained by scanning the samples in a 4.5 ml plastic cuvette at a speed of 4 nm/sec and a data interval of 1 nm.

1. Bright Blue Emission of Aqueous ZnS QDs

Figure 7:
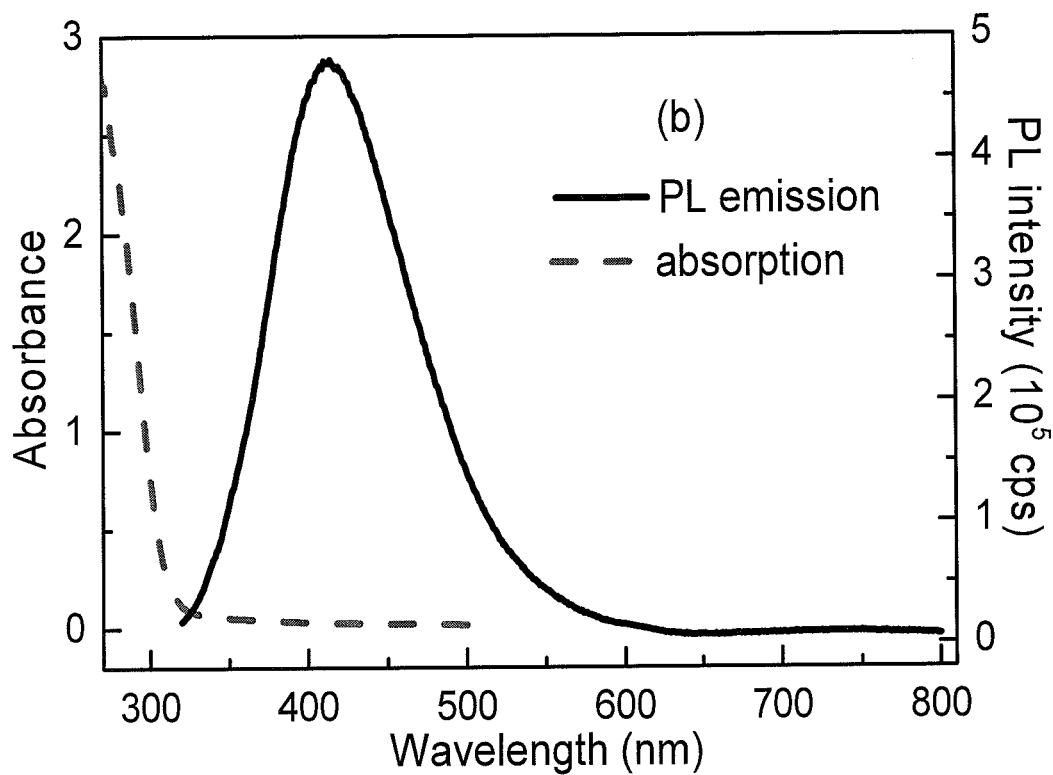
FIG. 7 shows the absorption (dashed line) and PL emission spectra (solid line) of ZnS QDs.

A ZnS QDs suspension synthesized at room temperature at pH=12 and with the composition of MPA:Zn:S=8:4:1 was placed on a 302 nm UV lamp (UVM-14, Ultra Violet Product Inc., Upland, Calif.), displaying bright blue photoluminescence. The aqueous ZnS QDs displayed a bright blue emission around 420 nm under the excitation of a UV lamp (302 nm). With Rhodamine 101 as the standard, the quantum yield of the ZnS QDs was measured to be 31%, higher than that of the commercial EviTags™ CdSe/ZnS core/shell QDs. As shown in FIG. 7, the QDs had an absorption edge near 312 nm and an emission peak at 415 nm.

Figure 8:
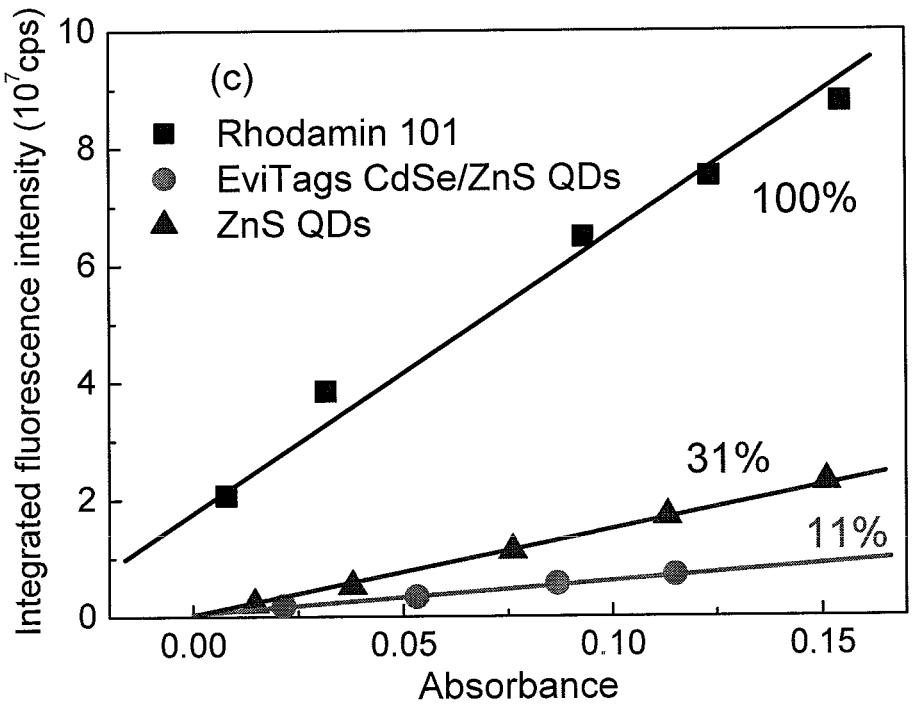
FIG. 8 shows the integrated fluorescence intensity versus absorbance of the standard Rhodamine 101 (squares), the commercial EviTags™ CdSe/ZnS QDs (circles) and the present ZnS QDs (triangles).

The quantum yield (QY) of the present ZnS QDs was also quantified. Quantum yield describes the efficiency of a material in converting the excitation into fluorescent emission. Rhodamine 101 was used as the standard. The commercial EviTags™ CdSe/ZnS QDs (Evident Technologies, Troy, N.Y.) were also included for comparison. The absorption and emission spectra were measured using a fixed excitation wavelength of 312 nm for all three systems at several concentrations. The absorbance was kept below 0.15 to avoid the re-absorption effect. The integrated fluorescence intensity was obtained by integrating the emission intensity over the entire wavelength range under the emission peak. In FIG. 8, the integrated emission intensity is plotted versus absorbance for Rhodamine 101 (full squares), EviTags™ CdSe/ZnS QDs (full circles) and the present aqueous ZnS QDs (full triangles). With the QY of Rhodamine 101 taken as 100%, the QY of the ZnS QDs was determined to be 31%, which was much higher than that of the commercial QDs, at about 11%.

2. Particle Size of ZnS QDs

Figure 9A:
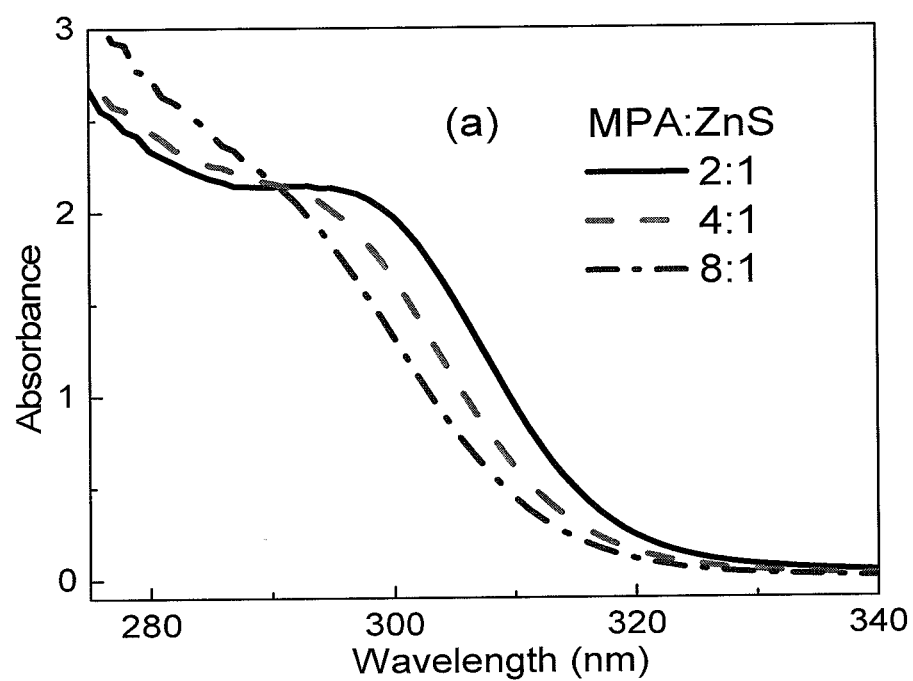
FIG. 9(a) shows the absorption spectra of ZnS QDs with different MPA:ZnS ratios, 2:1, 4:1 and 8:1.

ZnS QDs with different particle sizes were obtained by adjusting the ratio of MPA to ZnS. For three samples, the Zn:S ratio was kept at 1:1, and for three other samples the MPA: ZnS ratio was varied tot 2:1, 4:1 and 8:1. The absorption spectra were measured as shown in FIG. 9(a), and the particle sizes were calculated from the absorption edge according to the relationship between the band gap energy shift and the crystalline size. As listed in Table I, the samples with higher MPA to ZnS ratio had smaller particle sizes with a blue-shifted absorption edge. Specifically, the QDs with MPA: ZnS=8:1 had particle sizes of about 4.7 nm.

TABLE I

The absorption edges, particle sizes and emission peak wavelengths of the original, filtrate and retentate for three ZnS QDs samples with different MPA:ZnS ratios.

| | | MPA:ZnS | | |
|---|---|---|---|---|
| | | 2:1 | 4:1 | 8:1 |
| absorption edge (nm) | | 321 | 317 | 313 |
| particle size (nm) | | 5.4 | 5.0 | 4.7 |
| emission peak wavelength (nm) | original | 442 | 426 | 418 |
| | filtrate | 426 | 420 | 418 |
| | retentate | 446 | 429 | 420 |

Figure 9B:
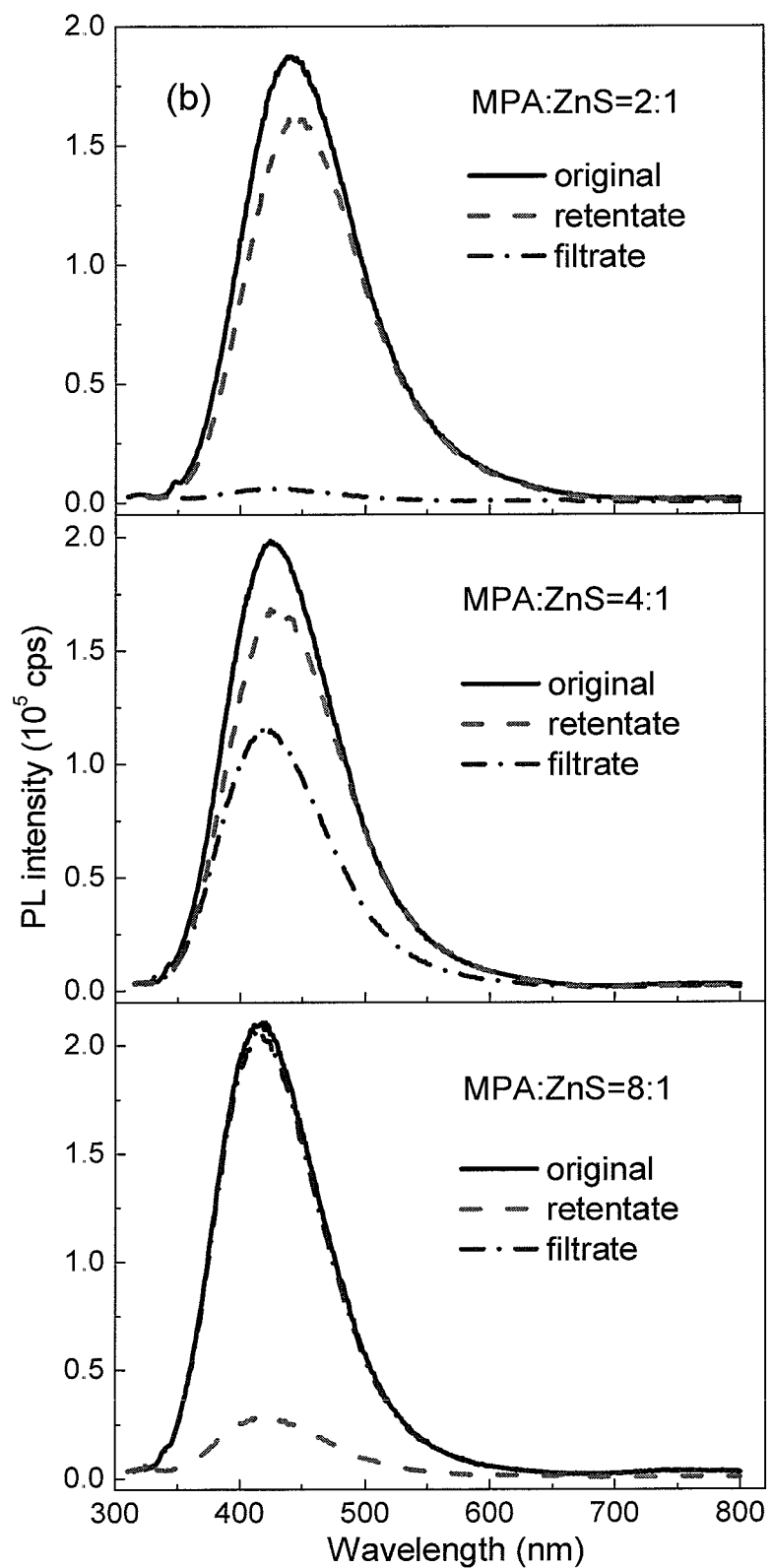
FIG. 9(b) shows the PL spectra of the original, retentate and filtrate of the three samples with different MPA:ZnS ratios.

The samples were filtered by microcentrifugation (MiniSpin plus, Eppendorf North America Co., Westbury, N.Y.) through 50 kD filter (Millipore Co., Billerica, Mass.) which has a pore size of about 5 nm. After centrifugation at 12000 rpm for 2 minutes, the smaller particles in the original suspension passed through the filter into the filtrate, while the larger particles remained in the retentate. In FIG. 9(b), the PL spectra of the initial suspension (solid line), that of the retentate (dashed line), and that of the filtrate (dotted-dashed line) for the three samples with different MPA:ZnS ratios are shown. For MPA:ZnS=2:1, the retentate retained most of the PL intensity while the filtrate showed negligible luminescence; with MPA:ZnS=4:1, decent emission was observed in both the retentate and filtrate; and with MPA:ZnS=8:1, the filtrate displayed the PL intensity as strong as the original suspension, but the retentate had little intensity. These results indicate that higher MPA:ZnS ratios can be employed produce smaller particle sizes, which is consistent with the calculation from the absorption edge. Meanwhile, the QDs with higher MPA:ZnS ratios also exhibited smaller emission peak wavelengths, as listed in Table I. For QDs with a particular MPA:ZnS ratio, the filtrate usually had a smaller emission peak wavelength and the retentate a larger emission peak wavelength than the original QD suspension.

During synthesis, the particle growth is controlled by competition between the $S^{2-}$ ions and the thiol group of MPA for linking to the cations on the growing particle surface. With a higher MPA concentration in the solution, more particle surface was covered by MPA, thus the particle growth was reduced. In the present study, we have achieved the ZnS QDs smaller than 5 nm (or the pores of 50 kD filter) with MPA:ZnS 8:1. In comparison, the commercial QDs typically have a size of 2540 nm due to the core-shell structure. ZnS particles studied earlier were also much larger with a size about 100 nm.

3. pH Effect

Figure 10:
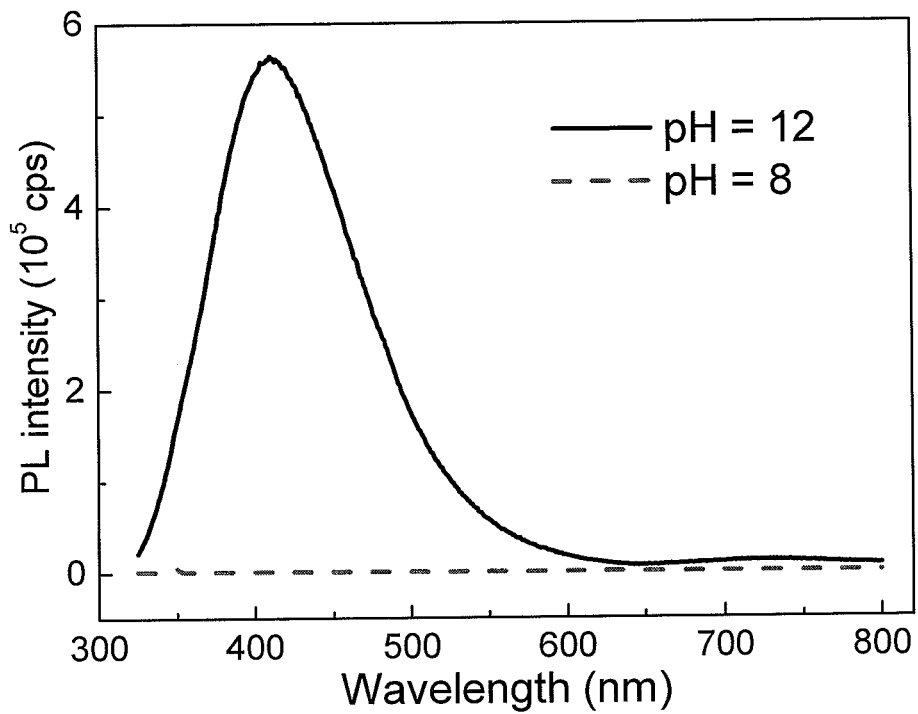
FIG. 10 shows the PL spectra of two ZnS QD samples with the same composition of MPA:Zn:S=8:4:1, synthesized at pH's of 8 and 12.

The emission intensity of the ZnS QDs can be influenced by the pH at which they were synthesized. To examine the pH effect, two samples were prepared at room temperature with the same composition of MPA:Zn:S=8:4:1, at two different pH values, pH 8 and pH 12. The PL emission spectra of these two ZnS QD suspensions are shown in FIG. 10. The QDs synthesized at pH 12 had a strong emission peak around 412 nm, while the QDs synthesized at pH 8 did not exhibit appreciable photoluminescence. Therefore, the bright blue emission of ZnS QDs is obtained from the sample synthesized at very high pH. This was attributed to the lower solubility of ZnS at higher pH, which allowed the ZnS QDs to precipitate and crystallize better and hence possess better PL properties.

4. MPA:Zn:S Ratio Effect

The composition ratio of MPA:Zn:S played a significant role for the photoluminescence of ZnS QDs. For comparison, several samples were produced at room temperature and pH 12, with the different ratios of MPA:Zn:S=2:1:1, 4:2:1 and 8:4:1. As shown in FIG. 11, the sample with more excess Zn displayed higher emission intensity. The ratio of MPA:Zn:S=8:4:1 was found to be an optimal composition showing a strong emission and high quantum yield. In addition, the sample with more MPA exhibited a smaller emission peak wavelength.

5. Hydrothermal Treatment Effect

Figure 12:
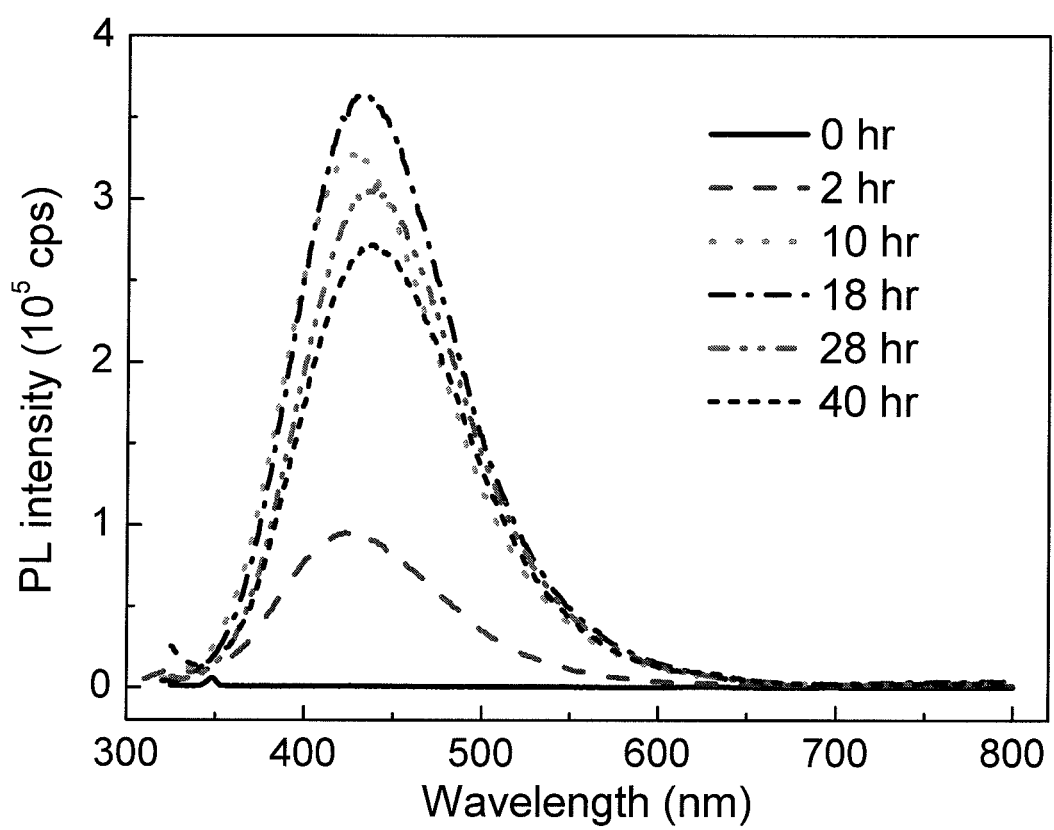
FIG. 12 shows the PL spectra of the ZnS QDs with MPA:Zn:S=8:4:1 and synthesized at pH 8, after hydrothermal treatment at 100° C. for various lengths of time.

Although the ZnS QDs synthesized at pH 8 at room temperature with a ration of MPA:Zn:S of 8:4:1 didn't show appreciable photoluminescence as discussed above, the PL can be improved by hydrothermal treatment after synthesis. The sample was heated to 100° C. in a hydrothermal bomb (Parr Instrument Co., Moline, Ill.) for various lengths of time and the emission spectrum was monitored at each step. As shown in FIG. 12, the PL intensity initially increased with increasing hydrothermal treatment time and the PL intensity reached a maximum value at 18 hrs, beyond which the PL intensity started to decrease with time. After 40 hrs, not only the PL intensity of the ZnS QDs was reduced, but the suspension became cloudy, indicating that aggregation occurred. Although the ZnS QDs synthesized at pH 8 had enhanced PL intensity after 18 hrs hydrothermal treatment, it was still not as bright as the sample synthesized at pH 12 at room temperature.

6. Defect Emission

The bulk ZnS has a band gap of 3.6 eV. Due to the quantum confinement effect and their small size, the ZnS QDs were expected to have a band gap larger than 3.6 eV and emit light in the UV range. However, the aqueous ZnS QDs exhibited blue photoluminescence within the wavelength range of 415-440 nm. This can be attributed to the trap state emission, which has smaller energy (larger wavelength) than the band edge emission of ZnS QDs. Because of the defects such as vacancies and interstitial sites of both Zn and S atoms, electrons and holes are readily localized in the defect states within the band gap. Therefore, radioactive transitions could occur between the band edge and the defect states, which give rise to the trap state emission. Since there are many possible transitions among different energy states, the spectrum of trap state emission is usually broader than that of the edge state emission. The PL spectrum of the aqueous ZnS QDs have a full width at half maximum (FWHM) about 100 nm.

The electron-hole recombination via surface localized states can lead to other possible trap state emissions as well. The interaction between zinc atoms and capping molecules may play a role in the surface state and the broad visible emission. More studies on the effect of different capping molecules for the aqueous ZnS QDs are on the way.

EXAMPLE IV

ZnS QDs Synthesized with MPS

ZnS QDs were synthesized directly with 3-mercaptopropyl trimethoxysilane (MPS) as the capping molecule in an all-aqueous procedure as described below. All the chemicals used in this study were purchased from Sigma-Aldrich (St. Louis, Mo.) and used as received. First, 0.04 M zinc nitrate ($Zn(NO_3)_2$) and 0.02 M sodium sulfide ($Na_2S$) solutions were prepared by dissolving zinc nitrate and sodium sulfide into deionized (DI) water, respectively. For a sample with a MPS:Zn:S ratio of 1/2:2:1, 0.04 mmol of MPS was dissolved in 41 ml of DI water and stirred for 5 minutes. 2 ml of the 0.04 M $Zn(NO_3)_2$ solution was added in drop-wise fashion with constant stirring for 10 minutes. The mixture was then titrated with tetrapropylammonium hydroxide to pH 12 and stirred for 10 minutes, followed by the rapid addition of 4 ml of the 0.02 M $Na_2S$ solution. 5 minutes was allowed for the ZnS nanoparticles to form before adding another 2 ml of the 0.04 M $Zn(NO_3)_2$ solution with constant stirring for 5 more minutes. The final suspension was clear and colorless with a volume of about 50 ml and a nominal ZnS concentration of 1.6 mM based on the concentration of S. The obtained QDs suspension was quenched at 0° C. and then stored at 4° C. Samples with different MPS:Zn:S ratios were synthesized in the same manner but with varying amounts of MPS.

Figure 13:
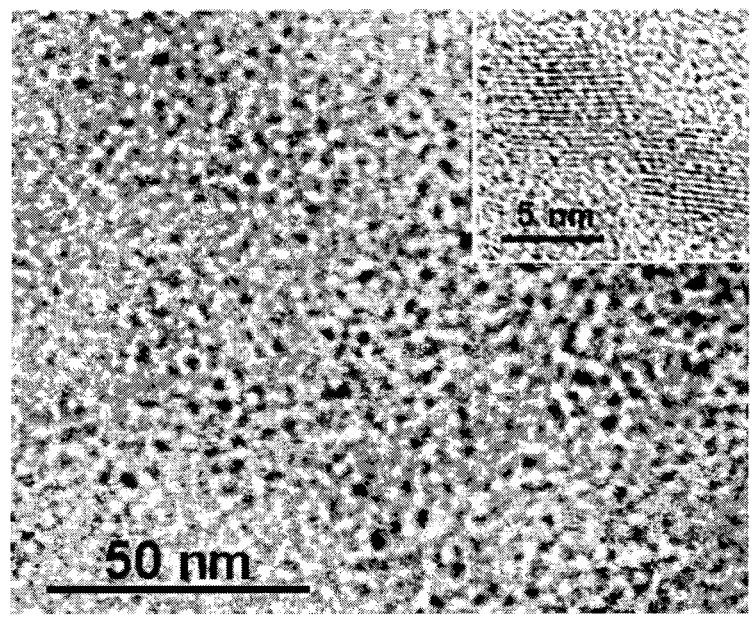
FIG. 13 shows the transmission electron microscopy (TEM) micrograph of MPS-capped ZnS QDs with an MPS:Zn:S ratio of 1/2:2:1. The dispersed QDs (individual black dots) can be clearly seen. The fringes at a higher magnification as shown in the insert indicated that the ZnS QDs were crystalline.
Figure 14:
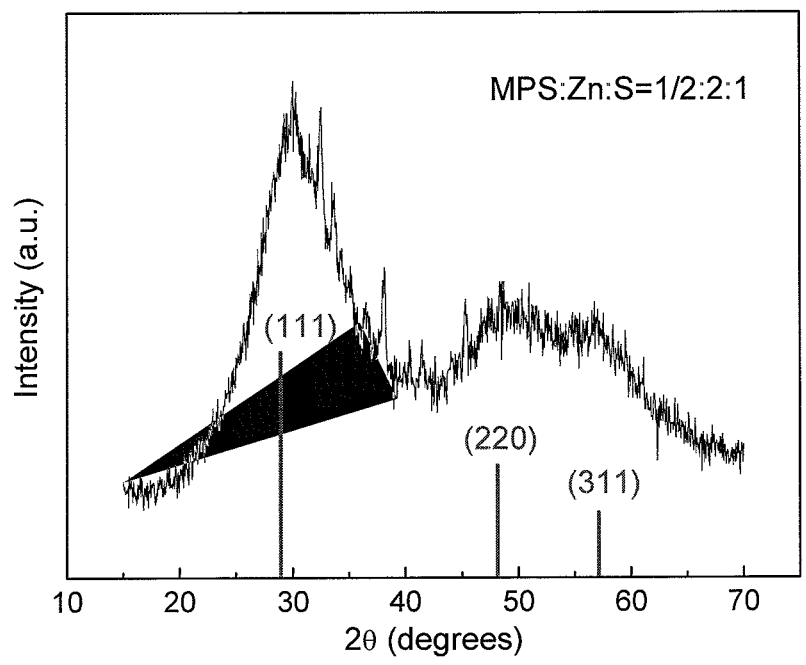
FIG. 14 shows the X-ray diffraction (XRD) pattern of MPS-capped ZnS QDs with an MPS:Zn:S ratio of 1/2:2:1. The lines indicate the XRD pattern of bulk ZnS with a cubic zinc blended structure.

FIG. 13 shows the TEM micrograph of the MPS-capped ZnS QDs with a MPS:Zn:S ratio of 0.5:2:1. The dispersed QDs (individual black dots) can be clearly seen. Higher magnification images showed that the size of the particles is about 5 nm. At a higher magnification as shown in the insert of FIG. 13, the lattice fringes of the nanoparticles can be clearly seen, indicating that the QDs were crystalline. The XRD pattern of the QD powder sample is shown in FIG. 14, which indicated that the QDs had a cubic zinc blended crystalline structure. The broad peaks in the XRD pattern indicated the small size of the QDs.

Figure 15:
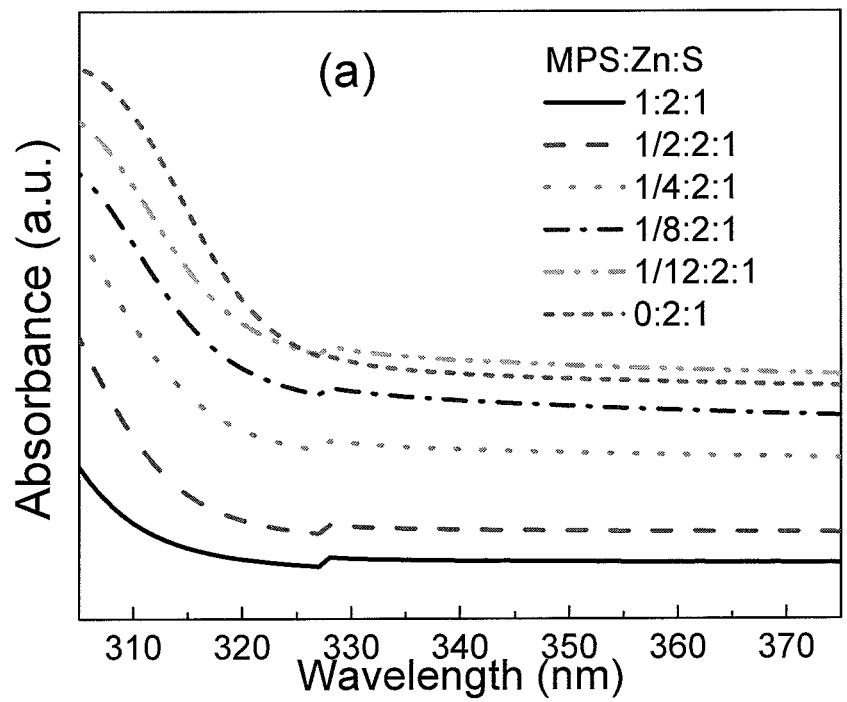
FIG. 15(a) shows the UV-Vis absorption spectra.
FIG. 15(b) shows the PL emission spectra of MPS-capped ZnS QDs with various MPS:Zn:S ratios.
FIG. 15(c) shows the integrated fluorescence intensity versus absorbance of MPS-capped ZnS QDs with MPS:Zn:S=1/2:2:1 and 0.25:2:1.
Figure 15:
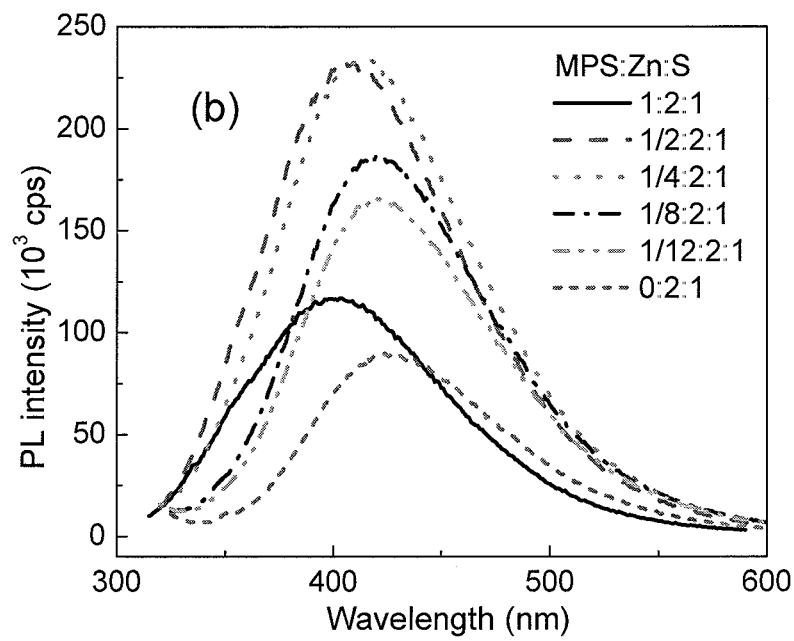
Figure 15:
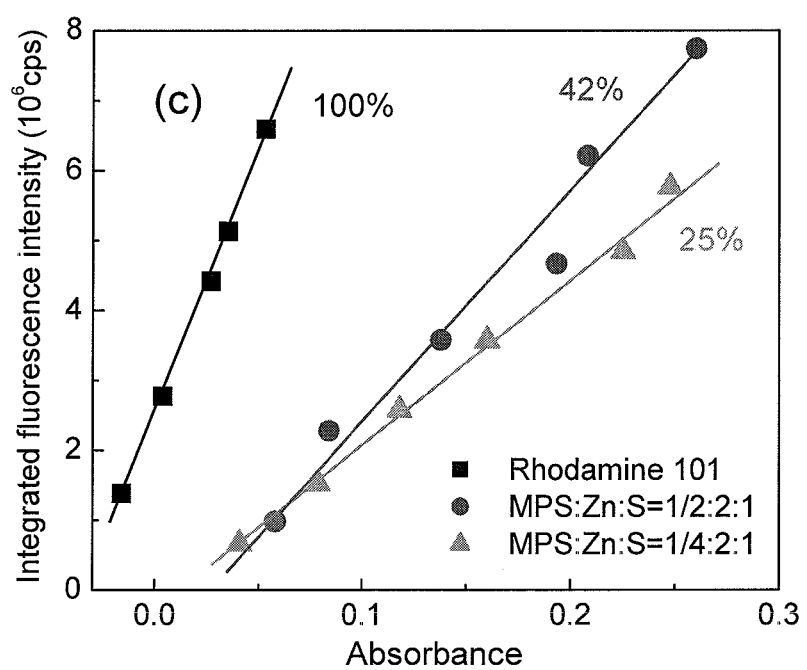

The normalized UV-Vis absorption spectra of the MPS-capped ZnS QDs with various MPS:Zn:S ratios are shown in FIG. 15(a), and the corresponding PL emission spectra are shown in FIG. 15(b). From FIGS. 15(a) and 15(b), one can see that both the absorption edge wavelength and the emission peak wavelength decreased with an increasing MPS molar ratio. Conceivably, with a higher MPS molar ratio, more MPS molecules would bind to the Zn ions on the QD surface, which would impede the growth of the QDs thereby resulting in QDs of a smaller size. A smaller QD size would provide a larger band gap, which in turn would decrease the absorption edge wavelength and the emission wavelength.[17] The diameters of the ZnS QDs with various MPS:Zn:S ratios, as estimated from their absorption edge wavelengths, are listed in Table II, along with the emission peak wavelengths and the absorption edge wavelengths. For all six samples, the QDs were around 5-6 nm in diameter, which is consistent with the QD size indicated by the TEM images shown in FIG. 13.

TABLE II

Emission peak wavelengths, absorption edge wavelengths, and particle diameters of the MPS-capped ZnS QDs with various MPS:Zn:S ratios.

| MPS:Zn:S ratio | emission peak wavelength (nm) | absorption edge wavelength (nm) | particle size (nm) |
| --- | --- | --- | --- |
| 1:2:1 | 401 | 316 | 4.9 |
| 1/2:2:1 | 407 | 319 | 5.2 |
| 1/4:2:1 | 413 | 321 | 5.4 |
| 1/8:2:1 | 420 | 323 | 5.6 |
| 1/12:2:1 | 421 | 325 | 5.8 |
| 0:2:1 | 427 | 328 | 6.2 |

During the synthesis of the MPS-capped ZnS QDs, excess Zn was added after the ZnS nanoparticles were formed. Empirically, it was found that the QDs with a Zn:S ratio of 2:1 exhibited higher emission intensity than those without excess Zn. Without being bound by theory, excess Zn may have formed a $Zn(OH)_2$ shell under the basic experimental conditions around the ZnS QDs.[18] Core-shell structures have been studied in many QD systems and have been shown to increase QDs' photoluminescence.[19,20] Another possibility was that the excess Zn plugged the otherwise negatively charged $S^{2-}$ sites on the QD surface, thereby enabling more MPS binding to the QDs (MPS binds to the cations on the surface, $Zn^{2+}$, in this case) and improved the PL emission intensity by making the QDs more stable and less prone to aggregation and degradation.

The emission intensity of the ZnS QDs exhibited a maximum with the MPS:Zn:S ratio between 0.5:2:1 and 0.25:2:1, as can be seen in FIG. 15(b). To characterize the quantum yield (QY) of the QDs with an MPS:Zn:S ratio of 0.5:2:1 and 0.25:2:1, in FIG. 15(c), the integrated fluorescence intensity is plotted versus the absorbance for these two samples as well as that of Rhodamine 101 at varying concentrations. Using Rhodamine 101 with a known QY of 100% as the standard and by comparing the slope of the curves, the deduced QY of the QDs with a ratio of MPS:Zn:S of 0.5:2:1 was 42%, and the deduced QY of the QDs with a ratio of MPS:Zn:S of 0.25:2:1 was 25%. These deduced QYs are comparable with that of the MPA-capped ZnS QDs, which was 31%.[14]

Figure 16:
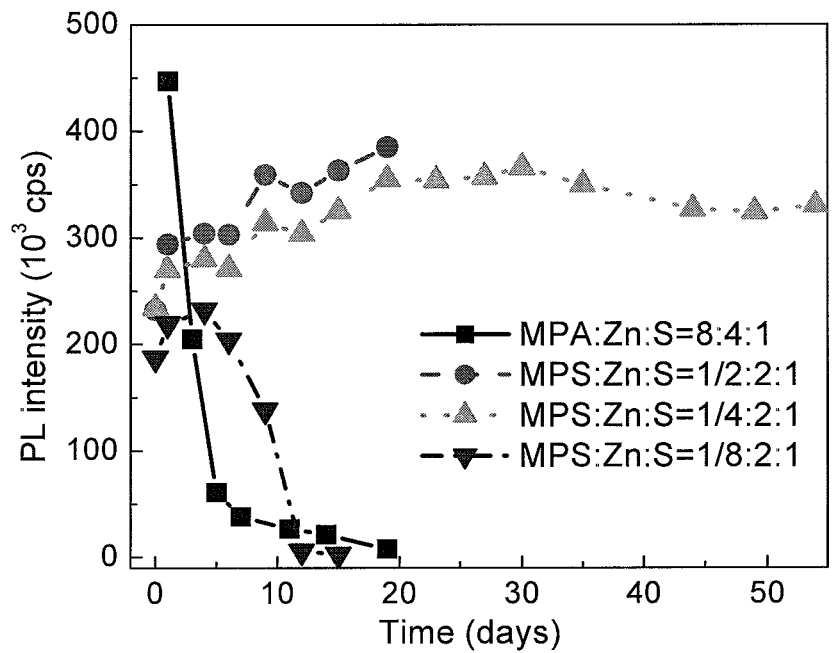
FIG. 16 shows the PL intensity versus time of MPS-capped ZnS QDs with various MPS:Zn:S ratios along with that of MPA-capped ZnS QDs with MPA:Zn:S ratio of 8:4:1 at room temperature and under normal laboratory lighting conditions.

To examine the temporal stability of the QDs, both the MPS-capped and the MPA-capped ZnS QDs were stored at room temperature and under regular daylight conditions (referred to as "ambient conditions"). In FIG. 16 the PL intensity is plotted versus time for QDs with MPS:Zn:S ratios of 0.5:2:1, 0.25:2:1, and 0.125:2:1. Also shown is the result for the MPA-capped ZnS QDs with a MPA:Zn:S ratio of 8:4:1, which was the composition that exhibited the highest emission intensity among all MPA-capped ZnS QDs.[14] For all the PL measurements, the QD concentration of all the samples was maintained at 1.6 mM. As can be seen, even though the emission intensity of the MPA-capped ZnS QDs was initially higher than that of the MPS-capped ZnS QDs, it decreased with time and lost most of the intensity after 5 days. Accompanying the emission degradation was the flocculation of the QDs. Over time, the initially clear suspension became increasingly cloudy and the aggregates eventually settled out. The PL intensity of the MPS-capped QDs with a ratio of MPS:Zn:S of 0.125:2:1 also decayed rapidly, presumably due to the insufficient MPS coverage on the QD surface.

In sharp contrast, the emission intensities of the QDs with ratios of MPS:Zn:S of 0.25:2:1 and 0.5:2:1 increased more than 40% over time. The sample with a ratio of MPS:Zn:S of 0.25:2:1 remained stable for more than 50 days. Monitoring of the QDs with a ratio of MPS:Zn:S of 0.5:2:1 was stopped after 20 days due to too small a sample volume to carry out the measurement and not due to observable degradation.

Figure 17:
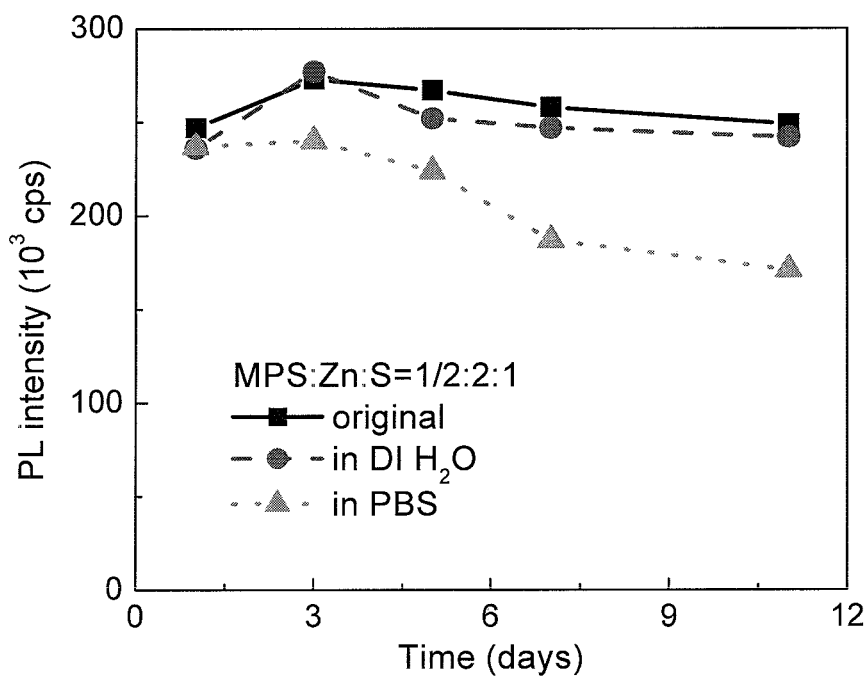
FIG. 17 shows the PL intensity versus time of MPS-capped ZnS QDs with MPS:Zn:S ratio of 1/2:2:1 at room temperature and in different aqueous solutions.

To examine the photostability of the MPS-capped ZnS QDs in DI water and in phosphate buffer saline (PBS) solution, the QDs with a ratio of MPS:Zn:S of 0.5:2:1 were first microcentrifuged (MiniSpin plus, Eppendorf, Westbury, N.Y.) with a 10 kD filter (Millipore Co., Billerica, Mass.) to remove the unreacted species, and then re-suspended in DI water and in PBS. The pH of QD suspension decreased from 12 to around 7 after the centrifugation and re-suspension. The PL intensities of the QDs in the synthesis solution, in DI water, and in PBS, respectively, were monitored at room temperature over time. As shown in FIG. 17, the QDs remained stable both in DI water and in the synthesis solution with little degradation in the PL intensity. In PBS, the QDs retained 70% of the initial emission intensity and remained clear after 10 days. These results indicated that the MPS capped ZnS QDs not only were stable in the synthesis solution but also in DI water and in PBS.

Figure 18:
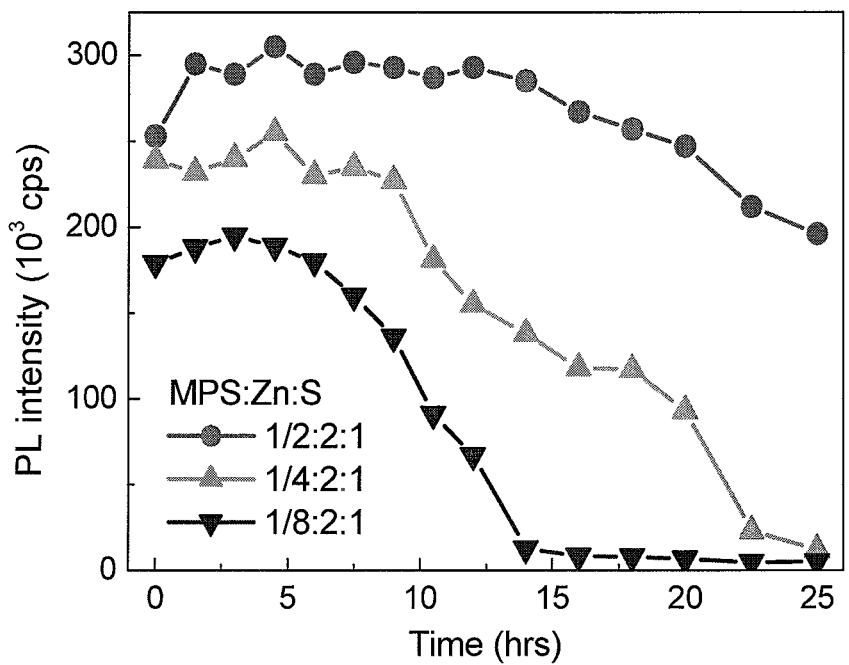
FIG. 18 shows the PL intensity of MPS-capped ZnS QDs with various MPS:Zn:S ratios versus heat treatment time at 50° C.

The effect of temperature on the stability of the MPS-capped ZnS QDs was also examined. The QDs with MPS:Zn:S ratios of 0.5:2:1, 0.25:2:1 and 0.125:2:1 were heat treated in three hydrothermal bombs (Parr Instrument Co., Moline, Ill.) at 50° C. After every 1-2 hrs, the samples were removed from the bombs and cooled to room temperature and their PL spectra were measured. In FIG. 18 the PL intensities of the QDs with various MPS:Zn:S ratios are plotted versus the heat treatment time. For all three samples, the emission intensity initially increased slightly for 4 hours of heat treatment and this initial increase was then followed by a slow decrease in the emission intensity over time. After treatment at 50° C., the QDs with ratios of MPS:Zn:S of 0.5:2:1, 0.25:2:1 and 0.125:2:1 retained their initial PL intensity for up to 20 hrs, 9 hrs and 6 hrs, respectively. Samples with higher MPS:Zn:S ratios retained the PL intensity longer, probably due to the better surface protection by a thicker MPS layer.

Figure 19:
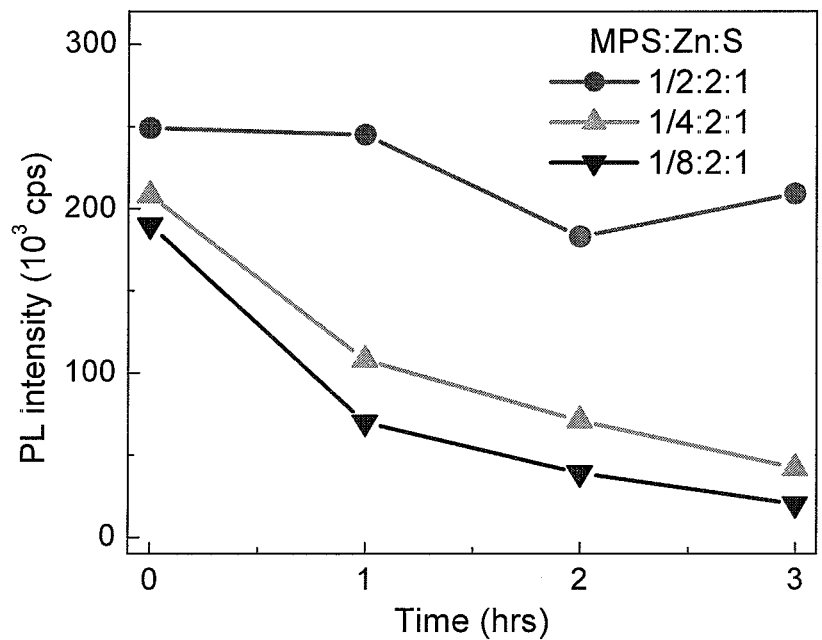
FIG. 19 shows the PL intensity versus time of MPS-capped ZnS QDs with various MPS:Zn:S ratios under continuous UV exposure.

In addition, the stability of the MPS-capped ZnS QDs was examined under continuous UV exposure. The QDs with MPS:Zn:S ratios of 0.5:2:1, 0.25:2:1, and 0.125:2:1 were loaded in cuvettes and placed on a 4W UV lamp with an illumination wavelength of 302 nm (UVP LLC., Upland, Calif.). The temperature of the samples could increase to 30-40° C. after several hours of UV exposure. However, before each PL measurement, the sample was allowed to cool to room temperature. As shown in FIG. 19, the QDs with a ratio of MPS:Zn:S of 0.5:2:1 retained better than 80% of the initial PL intensity after 3 hours of continuous UV exposure. Even the QDs with ratios of MPS:Zn:S of 0.25:2:1 and 0.125:2:1 retained more than 50% of their initial intensity after 1 hour of continuous UV exposure.

EXAMPLE VI

ZnS QDs Using the MPS Replacement Method

The synthesis of the desired aqueous ZnS QDs using the MPS replacement method included two steps: (1) precipitation with MPA, and (2) replacement of some or all of the MPA with MPS. First, MPA-capped QDs with a ratio of MPA:Zn:S of 8:4:1 were produced in water directly, as reported in an earlier study.[1] Briefly, the zinc nitrate solution and MPA were first mixed and stirred in deionized (DI) water. The pH of the mixture was adjusted to 12 by adding tetrapropylammonium hydroxide. Then, a sodium sulfide solution was added quickly to precipitate ZnS nanoparticles, followed by excess zinc nitrate solution to achieve enhanced emission. The obtained MPA-capped ZnS QDs suspension was quenched to 0° C. and stored in a refrigerator at 4° C. After one day, the sample reached equilibrium and the second step of the MPS replacement method can be carried out. The MPA-capped QDs were first microcentrifuged (MiniSpin Plus™, Eppendorf North America Co., Westbury, N.Y.) with 10 kD filter (Millipore Co., Billerica, Mass.) to remove the unused MPA molecules and other ions in the suspension. Then the MPS solution with pH adjusted to 12 by addition of tetrapropylammonium hydroxide, was added and mixed thoroughly. Different amounts of MPS were used to prepare samples with different MPS:Zn:S ratios. The final aqueous ZnS QDs suspension was clear and colorless. Unless otherwise mentioned, all of the ZnS QDs suspensions described below had a 1.6 mM nominal concentration based on the concentration of S.

Figure 20:
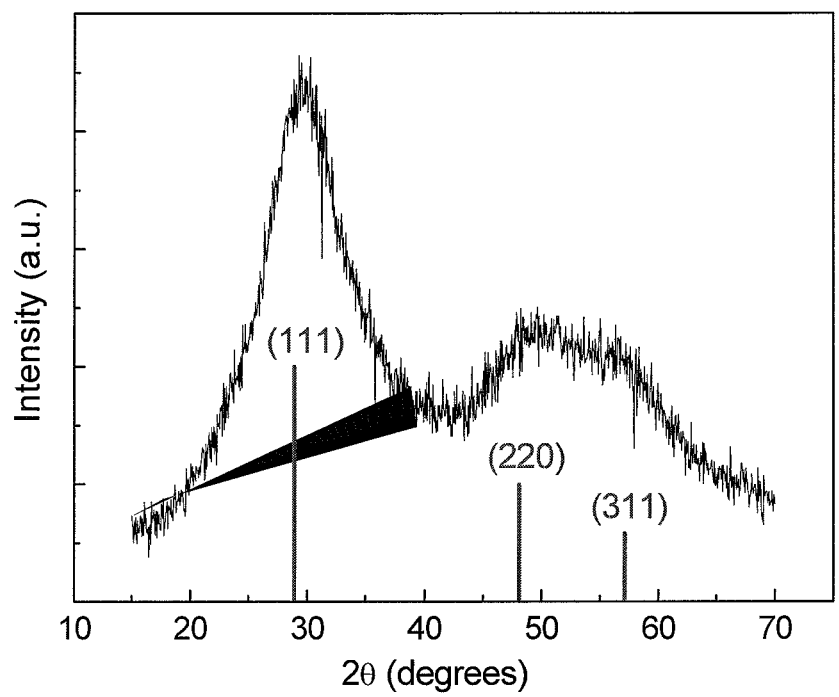
FIG. 20 shows the XRD pattern of the ZnS QDs prepared by the MPS replacement method and with the ratio MPS:Zn:S of 0.5:4:1.

FIG. 20 shows the XRD pattern of the ZnS QDs prepared by the MPS replacement method. The obtained QDs had the cubic zinc blend crystalline structure, which is the same as that of the MPA-capped[1] and MPS-capped[2] ZnS QDs. Therefore, the replacement of the capping molecules did not change the crystal structure of the nanoparticles.

Figure 21:
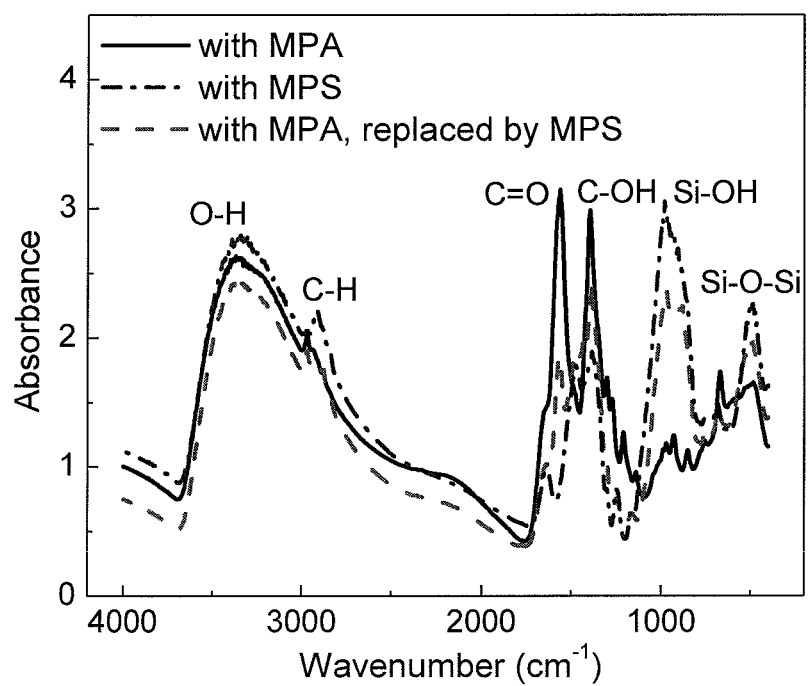
FIG. 21 shows the FTIR spectra of the MPA-capped ZnS QDs with the ratio MPA:Zn:S of 8:4:1, the MPS-capped ZnS QDs with the ratio MPS:Zn:S of 0.5:2:1, and the ZnS QDs prepared by the MPS replacement method with the ratio MPS:Zn:S of 0.5:4:1.

The surface conditions of the ZnS QDs with different capping molecules were confirmed by FTIR experiment. For comparison, the MPA-capped QDs with a ratio of MPA:Zn:S of 8:4:1, the MPS-capped QDs with a ratio of MPS:Zn:S of 0.5:2:1, and the QDs prepared using the MPS replacement method and having a ratio of MPS:Zn:S of 0.5:4:1 were examined and the results are shown in FIG. 21. The QDs directly synthesized with MPA displayed strong absorbance peaks around 1570 $cm^{-1}$ and 1400 $cm^{-1}$ which resulted from C=O and C—OH bonds in the carboxyl group of MPA. For the sample synthesized with MPA capping molecules which were subsequently replaced by MPS capping molecules, these two peaks were lowered, while two new peaks around 980 $cm^{-1}$ and 500 $cm^{-1}$ appeared, characteristic of Si—OH and Si—O—Si bonds.[21] This indicates that some of the MPA capping molecules were substituted by MPS capping molecules and both capping molecules are present on the QDs surface. The QDs directly synthesized with MPS displayed even higher peaks in the small wavenumber range, consistent with the dominance of MPS as the capping molecule. The peak around 3000 $cm^{-1}$ and the big hump at an even larger wavenumber existed in the spectra of all three samples, because they resulted from the C—H and O—H bonds which were part of the structures of both of the MPA and MPS capping molecules. The FTIR results demonstrate that the surface conditions of the ZnS QDs can be modified by direct synthesis or by replacement of at least some of the capping molecules with different capping molecules.

Figure 22:
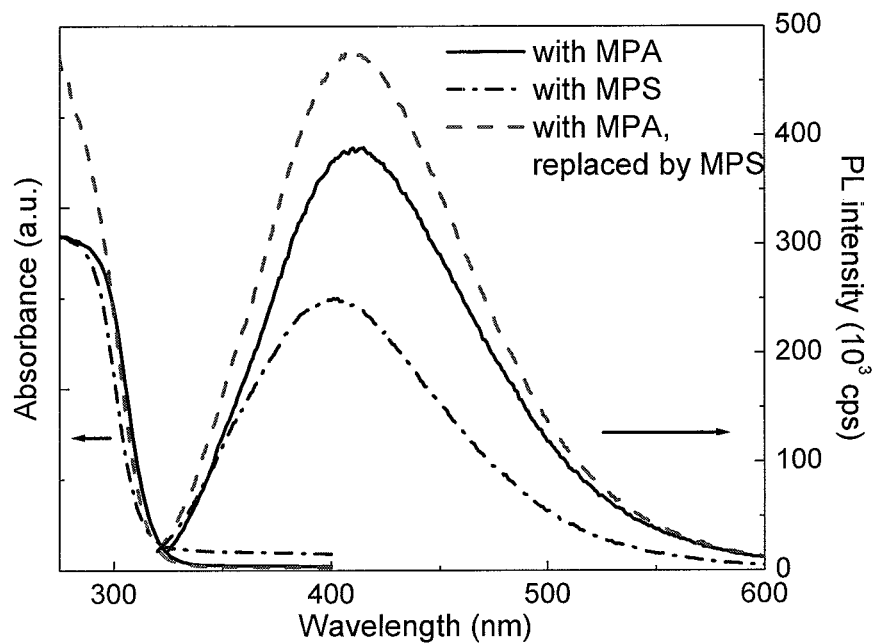
FIG. 22 shows the UV-Vis absorption and PL spectra of the MPA-capped ZnS QDs with the ratio MPA:Zn:S of 8:4:1, the MPS-capped ZnS QDs with the ratio MPS:Zn:S of 0.5:2:1, and the ZnS QDs prepared by the MPS replacement method with the ratio MPS:Zn:S of 0.5:4:1.

The UV-Vis absorption and PL spectra were measured and plotted together in FIG. 22 for three samples, the MPA-capped QDs with a ratio of MPA:Zn:S of 8:4:1, the MPS-capped QDs with a ratio of MPS:Zn:S of 0.5:2:1, and the ZnS QDs prepared by the MPS replacement method having a ratio of MPS:Zn:S of 0.5:4:1. These ratios were chosen to provide the maximum emission intensity for each synthesis method. As shown in FIG. 22, there was about a 100 nm difference between the emission peak wavelength and the absorption edge for each sample, indicating that the emissions were bulk trap emissions rather than band edge emissions.[1] The ZnS QDs obtained from the MPS replacement method displayed a higher PL intensity than the QDs synthesized directly with MPA or MPS. Meanwhile, the MPA-capped QDs and the QDs obtained by the MPS replacement method had the same emission peak wavelength and absorption edge, while the MPS-capped QDs had both the emission peak wavelength and absorption edge slightly blue-shifted. These results indicate that the MPS replacement method did not change the particle size of the original MPA-capped ZnS QDs, which was a little larger than the size of the MPS-capped QDs.[22]

Figure 23:
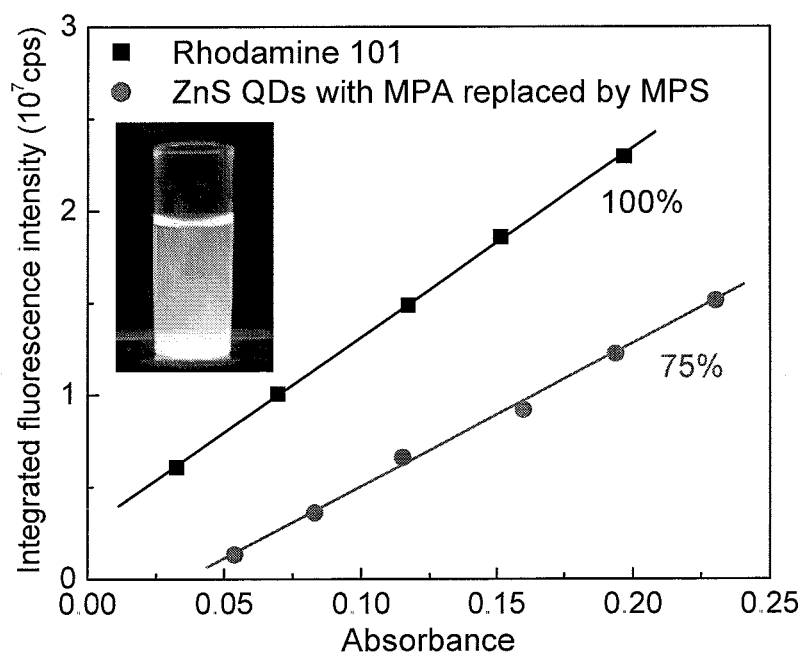
FIG. 23 shows the quantum yield of the ZnS QDs prepared by MPS replacement with the ratio MPS:Zn:S of 0.5:4:1, deduced by the slope of integrated fluorescence intensity versus absorbance. Insert of FIG. 23 shows the ZnS QDs suspension prepared by the MPS replacement method, which was placed on a UV lamp with the excitation wavelength of 302 nm, displaying the bright blue photoluminescence.

The quantum yield (QY) of the ZnS QDs prepared by the MPS replacement method was measured and the results are shown in FIG. 23. Using Rhodamine 101 with a known 100% QY as the standard, and by comparing the slope of integrated fluorescence intensity versus absorbance, it was deduced that the quantum yield of the QDs prepared by the MPS replacement method was 75%. This was much higher than the QY of the MPA-capped ZnS QDs of 31%,[1] as well as, the QY of the MPS-capped QDs of 25% or 42%.[3] Considering the relatively larger particle size due to precipitation with MPA and the better surface protection resulting from the MPS replacement method, the ZnS QDs could have good a absorption of excitation and a high emission-to-excitation ratio, which may produce this extraordinarily high quantum yield. The inset of FIG. 23 shows the bright blue photoluminescence of the ZnS QDs suspension prepared by MPS replacement, which was placed on a UV lamp with the excitation wavelength of 302 nm.

Figure 24:
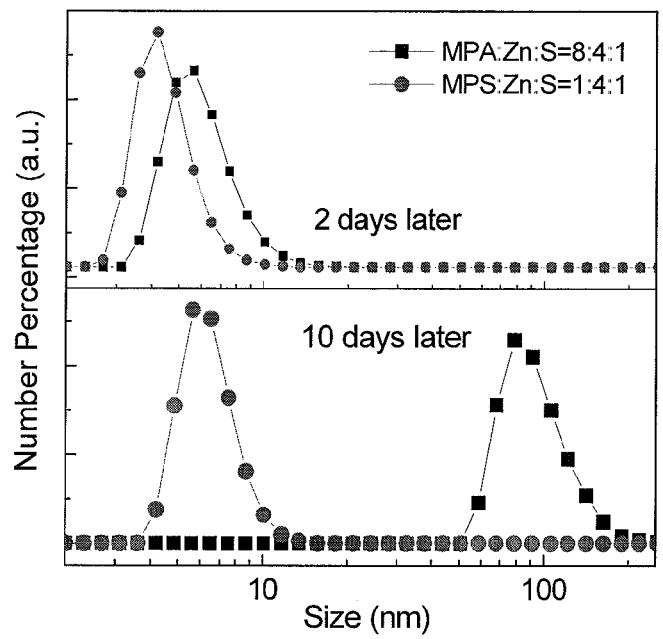
FIG. 24 shows the size change over time at ambient conditions of the MPA-capped ZnS QDs with the ratio MPA:Zn:S of 8:4:1 and the ZnS QDs prepared by the MPS replacement method and having the ratio MPS:Zn:S of 1:4:1.

The size change of the ZnS QDs by MPS replacement with a ratio of MPS:Zn:S of 1:4:1 and the MPA-capped QDs with a ratio of MPA:Zn:S of 8:4:1 were monitored over time and shown in FIG. 24. Although these two batches of QDs initially had similar sizes, after 2 days at ambient conditions, the MPA-capped QDs had sizes several nanometers larger than the QDs prepared by the MPS replacement method. After 10 days, the MPA-capped QDs suspension turned out to be slightly cloudy with the average size of the aggregate being nearly 100 nm, while the QDs made by the MPS replacement method remained relatively small, typically having a size of less than 10 nm. It was indicated that the QDs prepared by the MPS replacement method were more stable and dispersed better than the QDs that were directly synthesized with MPA.

Figure 25:
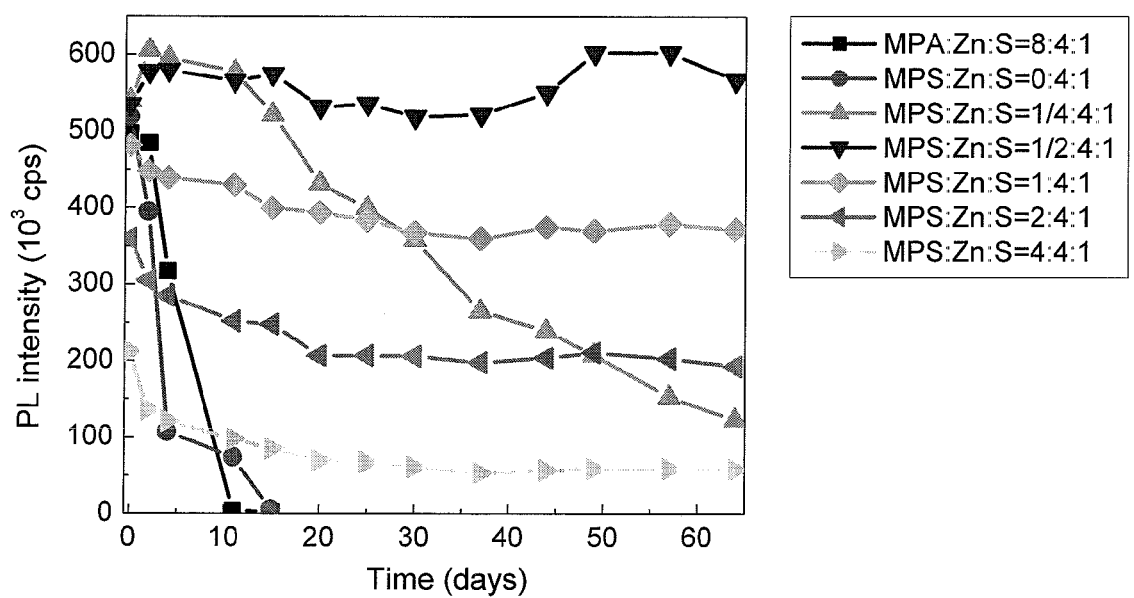
FIG. 25 shows the PL stability of the MPA-capped ZnS QDs with the ratio MPA:Zn:S of 8:4:1 and the ZnS QDs prepared by the MPS replacement method with different ratios at ambient conditions.

Furthermore, the photostability of the ZnS QDs having MPA capping molecules replaced with different amounts of MPS and the MPA-capped QDs made by direct synthesis were examined over a long period of time under ambient conditions. As shown in FIG. 25, the emission of the MPA-capped ZnS QDs degraded dramatically within 10 days, as did the emission of the QDs with the ratio MPS:Zn:S of 0:4:1. However, the ZnS QDs prepared by the MPA replacement method with the ratio MPS:Zn:S of 0.5:4:1 or higher were able to maintain the PL intensity for more than 60 days under ambient conditions, comparable with the MPS-capped ZnS QDs made by direct synthesis.[3] The QDs may by the MPS replacement method and having a ratio of MPS:Zn:S of 0.25:2:1 displayed a slowly decreasing PL intensity under ambient conditions over time, probably due to having an insufficient amount of MPS to provide effective protection to the QDs surface.

Apparently, the MPA does not stabilize the ZnS QDs as well as the disulfide reaction and dissociation of capping molecules. But this shortcoming can be overcome, if desired, by replacement of the MPA with a sufficient amount of MPS. Too much MPS undesirably decreased the emission intensity of the QDs, since they may be bridged by the cross linking of MPS thereby causing aggregation and degradation.

EXAMPLE VI

Cytotoxicity of CdS and ZnS QDs

The Alamar blue test was used to measure the cytotoxicity of CdS and ZnS QDs with different surface conditions to human endothelial cells (EA hy926). To neutralize the high pH and remove excess unreacted ions, all the QDs suspensions were rinsed with DI water by microcentrifugation with 10 kD filters 3 times immediately before being introduced into the cell culture medium.

Cell attachment and proliferation were measured with a continual fluorescence assay, using AlamarBlue (AB, Biosource, Alameda, Calif.). EA hy926 cells were seeded into 24-well culture plates at a density of 10,000 cells/well. Allowing 3 hours for attachment of the cells, the complete DMEM in wells was evacuated and replaced with fresh culture medium including CdS and ZnS QDs with different concentrations (1 μM and 10 μM) and surface conditions. After 2 days incubation, supernatants were removed and 1 ml fresh complete DMEM containing 5% (v/v) AB was added into each well. After another 3 hours incubation, double 100 μl aliquots of the AB containing medium was sampled from each well for fluorescence measurement, using the CytoFluor Multi-well Plate Reader. Subsequently, the cells were re-fed with fresh medium including QDs. For continual assessment of cell proliferation, the AB assay was performed every other day on the same cell population for up to 6 days until the cells reached confluence.

To obtain the calibration curve of cell number versus fluorescence intensity, different numbers of cells, namely, 0; 5,000; 10,000; 20,000; 40,000; 70,000; 100,000; 150,000 and 200,000 cells, were seeded into a 24-well plate. After 3 hours incubation, the complete medium was replaced with medium containing 5% (v/v) AB. After another 3 hours of incubation, the AB containing medium was collected from each well and the fluorescence measurement was taken. The plot of cell number versus fluorescence intensity was obtained with a polynomial fit. It was used to convert all the fluorescence readings in the AB test experiment into actual cell numbers.

For morphology assessment, EA hy926 cells were cultured in 6-well plates with CdS and ZnS QDs at different concentrations (1 μM and 10 μM) and surface conditions. After 3 days incubation, the supernatant was removed, and the samples were fixed with 10% buffered formalin for 15 minutes at room temperature. Following a gentle wash with PBS, the samples were incubated for 15 minutes in PBS containing 0.2% Triton-X 100 (Sigma) for cell membrane penetration, 2 mg/ml Hoechst 33258 (bis-benzimide, Sigma), a nuclear stain, and 1 mg/ml rhodamine-phalloidin (Phalloidin TRITC-labeled, Sigma), a specific stain for microfilaments. Then the samples were washed and soaked in PBS for 15 minutes to eliminate non-specific staining and for deep cleaning. Finally, the samples were visualized on a Leica DMRX microscope equipped with the appropriate fluorescence filters. Digital images were acquired using a Leica 300F camera.

Cells cultured without any QDs but under the same conditions were used as the control in every experiment. Each experiment was repeated 3 times to eliminate operational errors and for statistical analysis. Where applicable, all data are expressed as mean±standard deviation. Student's t-test and single factor ANOVA were used for parameter estimation and hypothesis testing, with $P<0.05$ and $P<0.01$ considered as being statistically significant.

The aqueous CdS and ZnS QDs with different surface conditions were investigated in the cytotoxicity study. Specifically, the CdS QDs were synthesized with MPA directly. Then, the MPA was replaced with MPS, and even with some excess silica. The ZnS QDs were synthesized with MPA or MPS in one-step procedure. Following that, at least some of the MPA was substituted by MPS using the MPS replacement method, or more silica was added to the MPS-capped ZnS QDs. According to those different surface conditions and the concentration of QDs diluted in cell culture medium, the samples were labeled as indicated in the Table III.

TABLE III

Labels of the CdS and ZnS QDs with different surface conditions and concentrations used in the cytotoxicity tests.

| QDs | Capping molecules | Concentration | Label |
|---|---|---|---|
| CdS | MPA | 1 μM | CdS 1L |
|  |  | 10 μM | CdS 1H |
|  | MPA + MPS | 1 μM | CdS 2L |
|  |  | 10 μM | CdS 2H |
|  | MPA + MPS + silica | 1 μM | CdS 3L |
|  |  | 10 μM | CdS 3H |

TABLE III-continued

Labels of the CdS and ZnS QDs with different surface conditions and concentrations used in the cytotoxicity tests.

| QDs | Capping molecules | Concentration | Label |
|---|---|---|---|
| ZnS | MPA | 1 μM | ZnS 1L |
|  |  | 10 μM | ZnS 1H |
|  | MPA + MPS | 1 μM | ZnS 2L |
|  |  | 10 μM | ZnS 2H |
|  | MPS | 1 μM | ZnS 3L |
|  |  | 10 μM | ZnS 3H |
|  | MPS + silica | 1 μM | ZnS 4L |
|  |  | 10 μM | ZnS 4H |

Figure 26:
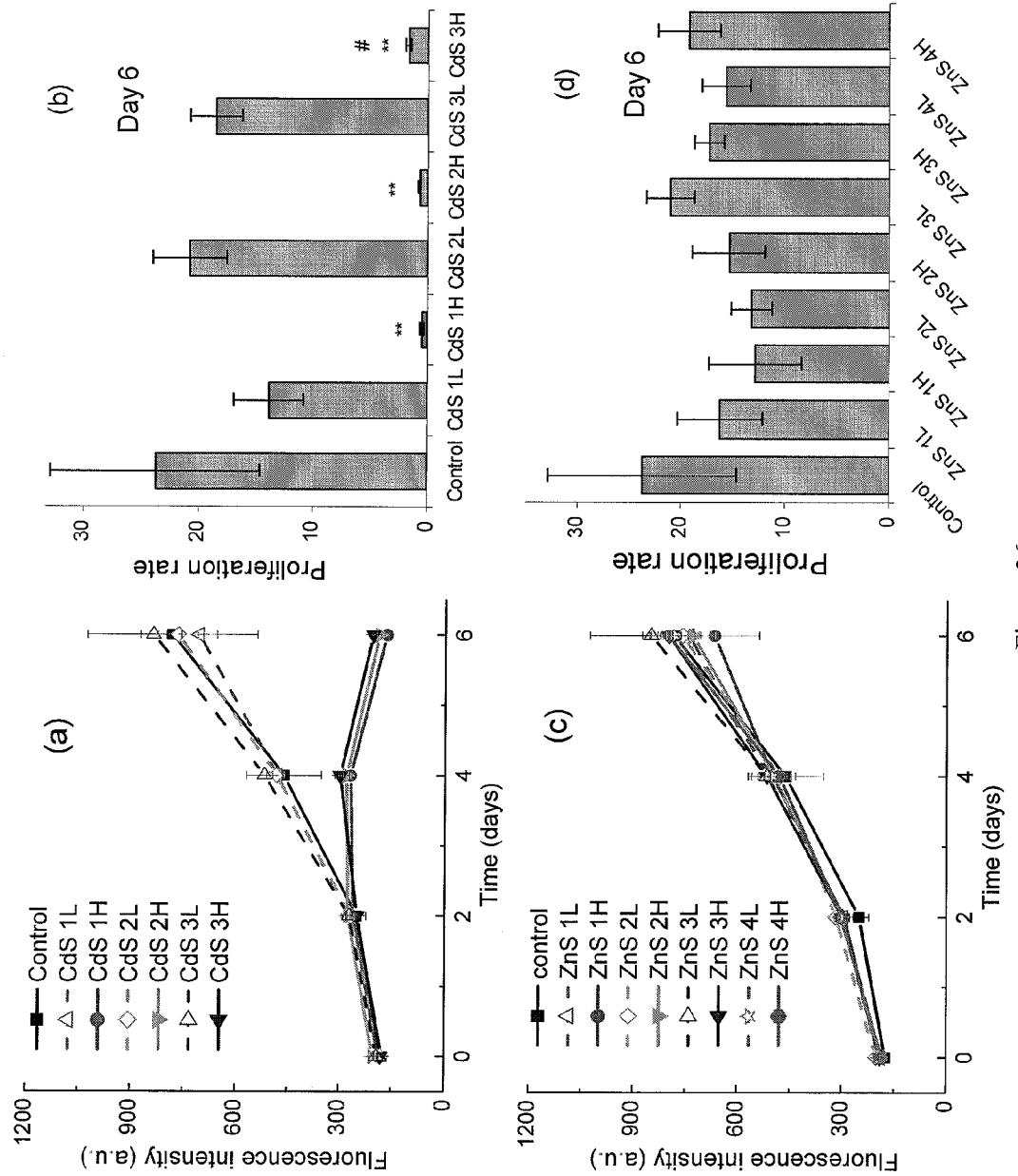
FIG. 26 shows the fluorescence intensity of AlamarBlue and the proliferation rate of endothelial cells after having been cultured for 6 days with CdS and ZnS QDs using different concentrations and surface conditions. ** indicates $P<0.01$, values are significantly different from the control. # indicates $P<0.05$, values are different from the CdS 1H and CdS 2H.

The QDs samples were incubated with EA hy926 cells continuously for 6 days, and the fluorescence of AlamarBlue from the cell culture medium was monitored every the other day. The fluorescence intensity versus time was plotted in FIG. 26(a) for CdS QDs and FIG. 26(c) for ZnS QDs. The samples with 10 μM CdS QDs had very limited fluorescence intensity over time, while the fluorescence intensity of the samples with 1 μM CdS QDs and all the ZnS QDs increased as stably as the control. Since only live cells can activate the fluorescence of AlamarBlue, the fluorescence intensity was proportional to the number of live cells. With a calibration curve of cell number versus fluorescence intensity, the results in FIGS. 26(a) and 26(c) were converted into cell number versus time, and the proliferation rate was calculated. As shown in FIGS. 26(b) and 26(d), at day 6, the samples with 1 μM CdS QDs and all of the ZnS QDs had proliferation rates comparable to the control. The CdS QDs of 10 μM displayed a significantly different proliferation rate from the control. Additionally, the 10 μM CdS QDs with excess silica had a little higher proliferation rate compared with the QDs made with MPA and the QDs made by the MPS replacement method.

The foregoing results indicate that the ZnS QDs and 1 μM CdS QDs had no discernable cytotoxicity to human endothelial cells while the CdS QDs at 10 μM exhibited an observable cytotoxicity. All of the QDs had similar particle sizes of about 5 nm, as characterized by dynamic light scattering. This indicates that particle size was not the cause of cytotoxicity. Rather, the compositions of the QDs caused the cytotoxicity. The non-heavy metal ZnS QDs showed no impairment to the endothelial cells. Although the addition of a silica coating provided better surface protection for the CdS QDs than pure MPA or MPS added by the replacement method at 10 μM, the silica coating did not completely eliminate the cytotoxicity of CdS QDs at this concentration.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

References, the disclosures of which are hereby incorporated by reference in their entirety.

[1] Quantum Dots Get Wet, *Science, volume* 300, p. 80, Apr. 4, 2003.
[2] S. G. Penn, L. He, and M. J. Natan, "Nanoparticles for Bioanalysis", *Curr Opin, Chem, Bio.*, 7, 1-7, (2003)
[3] M. L. Brongersma, "Nanoshells, "Gifts in a Gold Wrapper", *Nature Materials*, vol. 2, May 2003.
[4] Applied Nanoworks. http://www.appliednanoworks.com/

[5] Evident Technologies. http://www.evidenttech.com.
[6] S. Foglia, L. Suber, and M. Righini, "Size Tailoring of CdS Nanoparticles by Different Colloidal Chemical Techniques", *Colloid & Surfaces,* 177, 3-12, (2000)
[7] Z. Li and Y. Du, "Biomimic Synthesis of CdS Nanoparticles with Enhances Luminescence", *Mater, Lett.,* 57, 2480-2484, (2003)
[8] R. Ko, C. L. Torres-Martinez, and R. K. Mehra, "A Simple Colloidal Synthesis for Gram-Quantity Production of Water-Soluble ZnS Nanocrystal Powders", *J. Colloid and Interf. Sci.,* 227, 561-566, (2000)
[9] W. C. W. Chan, D. J. Maxwell, X. Gao, R. E Bailey, M. Han, and S. Nie, "Luminescent Quantum Dots for Multiplexed Biological Detection and Imaging," *Curr, Opin. Biotech.,* 13, 40-46 (2002)
[10] B. O. Dabbousi, J. Rodriguez-Viejo, F. V. Mikulec, J. R. Heine, H. Mattoussi, R. Ober, K. F. Jensen, and M. G. Bawendi, "(CdSe)ZnS Core-Shell Quantum Dots: Synthesis and Characterization of a Size Series of Highly Luminescent Nanocrystallites," *J. Phys, Chem. B,* 101, 9463-9475 (1997)
[11] M. Bruchez, M. Moronne, P. Gin, S. Weiss, and A. P. Alivisatos, "Semiconductor Nanocrystals as Fluorescent Biological Labels," *Science* 281, 2013-2015 (1998)
[12] D. Gerion, F. Pinaud, S. C. Williams, W. J. Parak, D. Zanchet, S. Weiss, and A. P. Alivisatos, "Synthesis and Properties of Biocompatible Water-Soluble Silica-Coated CdSe/ZnS Semiconductor Quantum Dots," *J Phys Chem B,* 105, 8861-8871 (2001)
[13] M. Green, R. Taylor, and G. Wakefield, "The Synthesis of Luminescent Adenosine Triphosphate Passivated Cadmium Sulfide Nanoparticles" *J. Mater. Chem.,* 13, 1859-1861 (2003)
[14] A. L. Rogash, L. Katsikas, A. Kornowski, Dangsheng Su, A. Eycmuller, and H. Weller, Synthesis and Characterization of Thiol-Stabilized CdTe Nanocrystals", *Ber, Bunsenges Phys. Chem.,* 100, 1772-1778 (1978)
[15] B. V. Enustun and J. Turkevich, "Coagulation of Colloidal Gold", *J. Am. Chem., Soc.,* 85, (21), 3317-3328, (1963)
[16] M. K. Chow and C. F. Zukoski, "Gold Sol Formation Mechanisms: Role of Colloidal Stability", *J. Colloid & Interf. Sci.,* 165, 97-109, (1994) and L. E. Brus, *J. Chem, Phys.,* 80, 4403 (1984)
[17] Brus L E 1984 Electron-electron and electron-hole interactions in small semiconductor crystallites: the size dependence of the lowest excited electronic state *J. Chem. Phys.* 80 4403-4409
[18] H. M. El-Khair, L. Xu, X. Huang, M. Li, and K. Chen 2001 Enhancement of band edge emission from $ZnS/Zn(OH)_2$ quantum dots Chinese Physics Letters 18 616-618
[19] B. O. Dabbousi, J. Rodriguez-Viejo, F. V. Mikulec, J. R. Heine, H. Mattoussi, R. Ober, K. F. Jensen and M. G. Bawendi 1997 (CdSe)ZnS core-shell quantum dots: synthesis and characterization of a size series of highly luminescent nanocrystallites *J. Phys. Chem., B* 101 9463-9475
[20] X. Peng, M. C. Schlamp, A. V. Kadavanich and A. P. Alivisatos 1997 Epitaxial growth of highly luminescent CdSe/CdS core/shell nanocrystals with photostability and electronic accessibility *J. Am. Chem. Soc.* 119 7019-7029
[21] Wade R. Thompson, Mei Cai, Mankit Ho, and Jeanne E. Pemberton, "Hydrolysis and Condensation of Self-Assembled Monolayers of (3-Mercaptopropyl)trimethoxysilane on Ag and Au Surfaces", *Langmuir* 1997, 13, 2291-2302
[22] L. E. Brus, "Electron-Electron and Electron-Hole Interactions in Small Semiconductor Crystallites: the Size Dependence of the Lowest Excited Electronic State", *J. Chem. Phys.,* 80(9), 4403-4409, (1984)

What is claimed is:

1. Zinc sulfide quantum dots comprising a component consisting essentially of zinc sulfide, which component is capped with at least one thiol-capping group selected from the group consisting of 3-mercaptopropionic acid group, a 3-mercaptopropyltrimethoxysilane group and a mixture thereof, wherein a molar ratio of thiol-capping groups to metal in the quantum dots is about 1.5-3, said quantum dots having an emission wavelength of from about 400-700 nm.

2. Zinc sulfide quantum dots as claimed in claim 1, wherein the emission wavelength is from about 400-500 nm.

3. Zinc sulfide quantum dots as claimed in claim 1, wherein the emission wavelength is from about 410-440 nm.

4. Zinc sulfide quantum dots as claimed in claim 1, wherein the quantum yield of the quantum dots is at least about 15%, using Rhodamine 101 as a standard of 100%.

5. Zinc sulfide quantum dots as claimed in claim 1, wherein the quantum yield of the quantum dots is at least 25%, using Rhodamine 101 as a standard of 100%.

6. Zinc sulfide quantum dots as claimed in claim 1, wherein the quantum yield of the quantum dots is at least 30%, using Rhodamine 101 as a standard of 100%.

7. Zinc sulfide quantum dots as claimed in claim 1, wherein the quantum yield of the quantum dots is at least 75%, using Rhodamine 101 as a standard of 100%.

8. Zinc sulfide quantum dots as claimed in claim 1, having a particle size of from about 2 to about 10 nm.

9. Zinc sulfide quantum dots as claimed in claim 1, having a particle size of from about 4 to about 6 nm.

10. Zinc sulfide quantum dots as claimed in claim 1, having a particle size of from about 4.5 to about 5.5 nm.

11. Zinc sulfide quantum dots as claimed in claim 1, wherein the thiol-capping groups comprise 3-mercaptopropionic acid groups.

12. Zinc sulfide quantum dots as claimed in claim 1, wherein the thiol-capping groups comprise 3-mercaptopropyltrimethoxysilane groups.

13. Zinc sulfide quantum dots as claimed in claim 1, wherein the thiol-capping groups comprise both 3-mercaptopropyltrimethoxysilane groups and 3-mercaptopropionic acid groups.

14. Zinc sulfide quantum dots as claimed in 13, wherein the ratio of 3-mercaptopropyltrimethoxysilane groups to Zinc to sulfide is from about 0.125:4:1 to about 12:4:1.

\* \* \* \* \*